(12) United States Patent
Naito

(10) Patent No.: US 7,852,365 B2
(45) Date of Patent: Dec. 14, 2010

(54) OPTICAL SCANNING APPARATUS AND COLOR IMAGE FORMING APPARATUS

(75) Inventor: Yuuta Naito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 12/332,072

(22) Filed: Dec. 10, 2008

(65) Prior Publication Data

US 2009/0153644 A1 Jun. 18, 2009

(30) Foreign Application Priority Data

Dec. 13, 2007 (JP) ............................. 2007-322077

(51) Int. Cl.
*B41J 15/14* (2006.01)
*B41J 27/00* (2006.01)
(52) U.S. Cl. ...................... 347/243; 347/259
(58) Field of Classification Search ................ 347/231, 347/241–245, 256–261
See application file for complete search history.

(56) References Cited

U.S. PATENT DOCUMENTS

| | | | |
|---|---|---|---|
| 6,587,137 B2 | 7/2003 | Shinohara et al. | |
| 6,992,807 B2* | 1/2006 | Shimomura | 359/207.1 |
| 7,149,018 B2* | 12/2006 | Yoshikawa et al. | 359/204.1 |
| 7,355,617 B2* | 4/2008 | Serizawa et al. | 347/245 |
| 7,525,709 B2* | 4/2009 | Kimura | 359/204.1 |
| 7,679,634 B2* | 3/2010 | Komai et al. | 347/235 |

FOREIGN PATENT DOCUMENTS

| JP | 2002-055292 A | 2/2002 |
|---|---|---|
| JP | 2003-222812 A | 8/2003 |
| JP | 2005-017630 A | 1/2005 |

* cited by examiner

*Primary Examiner*—Hai C Pham
(74) *Attorney, Agent, or Firm*—Canon U.S.A., Inc. I.P. Division

(57) ABSTRACT

An optical scanning apparatus includes light source units; a deflecting unit, incident optical systems provided so as to correspond to the light source units, and at least one synchronous detection optical system that controls a timing at which the light beams form images on the surfaces to be scanned. The synchronous detection optical system includes a synchronous detection element, at least one optical path changing unit, and at least one synchronous detection optical element. The synchronous detection element is attached to a circuit substrate of the light source unit arranged to oppose the light source unit that emits a light beam used for synchronous detection, with the deflecting unit therebetween. The synchronous detection optical element and the synchronous detection element are arranged to oppose each other with respect to a line perpendicular to lines connecting a deflection axis of the deflecting unit and optical axes of the imaging optical systems.

7 Claims, 18 Drawing Sheets

$X = \alpha Y^2 + \beta Y + \gamma$

OPTICAL SCANNING APPARATUS AND COLOR IMAGE FORMING APPARATUS

BACKGROUND OF THE INVENTION

1. Field of the Invention

The present invention relates to optical scanning apparatuses and image forming apparatuses. More particularly, the present invention pertains to scanning apparatuses suitable for use in image forming apparatuses employing an electrophotography process, such as laser beam printers, digital photocopiers, and multifunction printers, and to such image forming apparatuses.

2. Description of the Related Art

In an optical scanning apparatus used in a laser beam printer (LBP) or the like, a light source unit emits a light beam after modulation thereof performed in accordance with an image signal, and a rotatable polygonal mirror, which serves as a deflecting unit, periodically deflects the light beam. An imaging optical system having an fθ characteristic focuses the deflected light beam to a spot (imaging spot) on the surface of a photosensitive recording medium (photosensitive drum), and scans the surface with the imaging spot. Thus, image recording is performed.

Such an optical scanning apparatus has a synchronous detection sensor (synchronous detection element), which serves as a photodetector. The synchronous detection sensor adjusts the timing at which image formation on the surface of the photosensitive drum starts (hereinafter, "image-forming timing"), before the imaging spot is scanned over the surface of the photosensitive drum.

The synchronous detection sensor receives a synchronous detection light beam, which is a portion of a light beam deflected by the deflecting unit. A synchronous detection signal is detected from an output signal of the synchronous detection sensor. The image-forming timing is adjusted according to the synchronous detection signal.

Optical scanning apparatuses these days have an optical deflector having two deflecting surfaces. Light beams incident on the deflecting surfaces are simultaneously deflected to be scanned over the surfaces of the photosensitive drums. Such optical scanning apparatuses have been developed to meet the demand for reduction in size of these apparatuses. Japanese Patent Laid-Open No. 2002-055292 discloses an example of such optical scanning apparatuses.

Such optical scanning apparatuses have reduced the number of optical deflectors used in such an optical scanning apparatus, which previously had to be the same number as the light beams, to half. Thus, the above-described structure contributed to a reduction in size of optical scanning apparatuses.

Japanese Patent Laid-Open Nos. 2003-222812 and 2005-017680 disclose optical scanning apparatuses in which a synchronous detection element and a light source unit are attached to the same substrate. This structure contributes to a further reduction in size of the above-described optical scanning apparatuses.

FIG. 14 is a schematic view of an important part of the optical scanning apparatus disclosed in Japanese Patent Laid-Open No. 2005-017680.

The optical scanning apparatus shown in FIG. 14 has an optical box 200, in which laser emitting devices 121 and 122, an optical deflector 140, and a synchronous detection element 171, and the like are provided.

In FIG. 14, a light beam emitted from the laser emitting device 121 is directed to the synchronous detection element 171 via a reflecting mirror 156, an optical deflector 140, a reflecting mirror 163, and a synchronous detection optical system 164. Similarly, a light beam emitted from the laser emitting device 122 is directed to the synchronous detection element 171 via a reflecting mirror 155, the optical deflector 140, again the reflecting mirror 155, and a synchronous detection optical system 161. The synchronous detection element 171 detects each of the light beams emitted from the laser emitting devices 121 and 122 to control the image-forming timing.

FIG. 14 also shows imaging optical systems 151 and 162 having fθ characteristics.

The optical scanning apparatus shown in FIG. 14 deflects light beams with two deflecting surfaces of the optical deflector 140 to reduce the size of the optical scanning apparatus. The synchronous detection element 171 and the laser emitting device 122 are attached to the same substrate to further reduce the size of the optical scanning apparatus.

Image forming apparatuses (printing apparatuses) employing an electrophotography process these days require higher image quality. In particular, in color photocopiers, occurrence of color misregistration is a serious problem in obtaining high quality images.

One of the causes of color misregistration is variation in the position at which the imaging spot forms an image (hereinafter, an "image-forming position"), among the surfaces to be scanned (hereinafter, "scan surfaces") of the photosensitive drums for each color. Variation in image-forming position is caused by an error in the shape of components, an error in installation of the components into a printing apparatus, or an error in the shape of a housing to which the components are attached. Such an error in the shape or installation causes variation in image-forming timing, and hence, variation in image-forming position, among the scan surfaces for each color. To minimize the variation in image-forming timing among the scan surfaces for each color, the focal length of the synchronous detection optical system needs to be increased. Two reasons for this are described below.

First, there may be a difference in detection timing due to an error in installation, in the scanning direction, of a synchronous detection slit. FIGS. 15A and 15B are schematic views of a synchronous detection optical system, showing a light beam is deflected and scanned by a deflecting unit. FIG. 15A shows an ideal state in which a synchronous detection slit (hereinafter, a "BD slit") 11 is installed with no error in installation. FIG. 15B shows a state in which the BD slit 11 is installed with an error in installation, i.e., installed at a position shifted from the correct position by an amount ΔY in the scanning direction. The scanning speed Vs over the BD slit 11 is expressed as follows:

$$Vs = (fb/f) \times Vd$$

where fb is the focal length of a synchronous detection optical element 9 in the main scanning direction, f is the focal length of an imaging optical system 15 in the main scanning direction, and Vd is the scanning speed over a scan surface 8. By increasing fb, Vs is increased.

The difference in detection timing, ΔT, at which the light beam passes through the BD slit 11, between the case in which the BD slit 11 is installed with no error in installation (FIG. 15A) and the case in which the BD slit 11 is installed with an error in installation (FIG. 15B) is expressed as follows:

$$\Delta T = \Delta Y / Vs$$

Thus, even if an error in installation of an amount ΔY occurs, the difference in detection timing, ΔT, from the ideal nominal value established in the design phase, can be minimized by increasing Vs. By increasing fb, Vs is increased. As a result, the absolute magnitude of the difference in detection timing, ΔT, is reduced, whereby the relative amount of color misregistration occurring when images of each color are superposed is reduced.

Second, there is a difference in detection timing due to an error in installation of the synchronous detection slit in a direction in which the light beam travels, occurring when a multibeam light source is used. FIG. 16A shows light beams emitted from two multibeam light sources reaching the BD slit 11. These two multibeams are emitted from two light sources separated by the largest distance, in the main scanning direction. FIG. 16B shows a state in which the BD slit 11 is installed with an error in installation, i.e., installed at a position shifted from the correct position by an amount ΔX in the direction in which the light beams travel.

Let us assume that the position of the light beam on the BD slit 11 is shifted by an amount ΔY because the position of the BD slit 11 is shifted by an amount ΔX. The difference in the detection timing, ΔT, at which the light beam passes through the BD slit 11, between the case in which the BD slit 11 is installed with no error in installation (FIG. 16A) and the case in which the BD slit 11 is installed with an error in installation (FIG. 16B) is expressed as follows:

$$\Delta T = \Delta Y / V_s$$

Thus, even if an error in installation of an amount ΔY occurs, the difference in detection timing, ΔT, from the ideal nominal value established in the design phase can be minimized by increasing Vs. By increasing fb, Vs is increased. As a result, the absolute magnitude of the difference in detection timing, ΔT, is reduced, whereby the relative amount of color misregistration occurring when images of each color are superposed is reduced.

In addition, even if an error in installation of an amount ΔX occurs, the amount of error in installation, ΔY, can be minimized by increasing fb. Thus, increasing fb is effective for reducing the difference in detection timing, ΔT, from the standpoints of ΔY and Vs.

Because of these reasons, increasing fb is effective for reducing the relative amount of misregistration of image-forming position among the scan surfaces for each color.

However, the accuracy of synchronous detection has not been sufficiently considered in known optical scanning apparatuses.

SUMMARY OF THE INVENTION

The present invention provides an optical scanning apparatus capable of producing high quality images, while suppressing occurrence of variation in image-forming position among the scanning units. The present invention also provides an image forming apparatus having such an optical scanning apparatus.

According to a first aspect of the present invention, an optical scanning apparatus includes: a plurality of light source units; a deflecting unit having a plurality of deflecting surfaces, the deflecting surfaces configured to deflect and scan light beams emitted from the light source units; a plurality of incident optical systems configured to direct the light beams emitted from the light source units to the different deflection surfaces of the deflecting unit, the incident optical systems provided so as to correspond to the light source units; a plurality of imaging optical systems configured to converge the light beams on a plurality of surfaces to be scanned, the imaging optical systems arranged in optical paths of the light beams deflected and scanned by the deflecting surfaces of the deflecting unit; and a synchronous detection optical system configured to determine a timing at which the light beams form images on the surfaces to be scanned. The imaging optical systems are arranged, in a main scanning cross-section, to oppose each other with the deflecting unit therebetween. The synchronous detection optical system includes a synchronous detection element configured to detect one of the light beams deflected and scanned by the deflecting surfaces of the deflecting unit, at least one optical path changing unit arranged in an optical path between the deflecting unit and the synchronous detection element, the optical path changing unit configured to change an optical path of said one of the light beams deflected and scanned by the deflecting surface of the deflecting unit and direct said one of the light beams to the synchronous detection element, and at least one synchronous detection optical element arranged in an optical path between the optical path changing unit and the synchronous detection element. The synchronous detection optical element has a refractive power at least in a main scanning direction. The synchronous detection element is attached to a substrate of the light source unit arranged to oppose the light source unit that emits the light beam used for synchronous detection, with the deflecting unit therebetween, in the main scanning cross-section. The synchronous detection optical element and the synchronous detection element are arranged to oppose each other with respect to a straight line perpendicular to lines connecting a deflection axis of the deflecting unit and optical axes of the imaging optical systems.

According to a second aspect of the present invention, in the optical scanning apparatus according to the first aspect, each of the imaging optical systems includes an imaging optical element, and the light beam directed to the synchronous detection element do not pass through any of the imaging optical elements.

According to a third aspect of the present invention, in the optical scanning apparatus according to the first aspect, each of the imaging optical systems includes an imaging optical element, and the light beam directed to the synchronous detection element pass through at least one of the imaging optical elements, and the optical path changing unit be arranged in an optical path between the imaging optical element and the synchronous detection optical element.

According to a fourth aspect of the present invention, in the optical scanning apparatus according to the second aspect, more than one imaging optical element is provided, and the optical scanning apparatus satisfy the following condition:

$$0.6 \times Lg \leq fb \leq 1.2 \times Lg,$$

where Lg (mm) is the physical distance between the light source unit that emits the light beam used for synchronous detection and an exterior of the imaging optical element that is optically closest to the deflecting unit, and fb (mm) is the focal length of the synchronous detection optical element in a main scanning direction.

According to a fifth aspect of the present invention, in the optical scanning apparatus according to the third aspect, more than one imaging optical element is provided, and the optical scanning apparatus satisfy the following condition:

$$0.6 \times Lg \leq fg \leq 8.0 \times Lg$$

where Lg (mm) is the physical distance between the light source unit that emits the light beam used for synchronous detection and an exterior of the imaging optical element that is optically closest to the deflecting unit, and fg is the combined focal length in a main scanning direction of the synchronous detection optical element and all the imaging optical elements through which the synchronous detection light beam has passed.

According to a sixth aspect of the present invention, a color image forming apparatus includes a plurality of image bearing members on which images of different colors are formed. The image bearing members are arranged at positions corresponding to the surfaces to be scanned of the optical scanning apparatus according to the first aspect.

According to a seventh aspect of the present invention, in the color image forming apparatus according to the sixth aspect, it is desirable that the color image forming apparatus further include a printer controller configured to convert color signals input from an external device into image data of different colors, and input the image data to the optical scanning apparatus.

The present invention provides an optical scanning apparatus capable of producing high quality images, while suppressing occurrence of variation in image-forming position among the scanning units. The present invention also provides an image forming apparatus having such an optical scanning apparatus.

Further features of the present invention will become apparent from the following description of exemplary embodiments with reference to the attached drawings.

DESCRIPTION OF THE EMBODIMENTS

Herein, the "optical path length" is the optical distance between the deflection point of an optical deflector and a scan surface. Herein, the "optical distance" is the distance over which the light beam travels, in the state where the optical path is developed.

Embodiments of the present invention will be described below, with reference to the drawings.

First Embodiment

Figure 1:
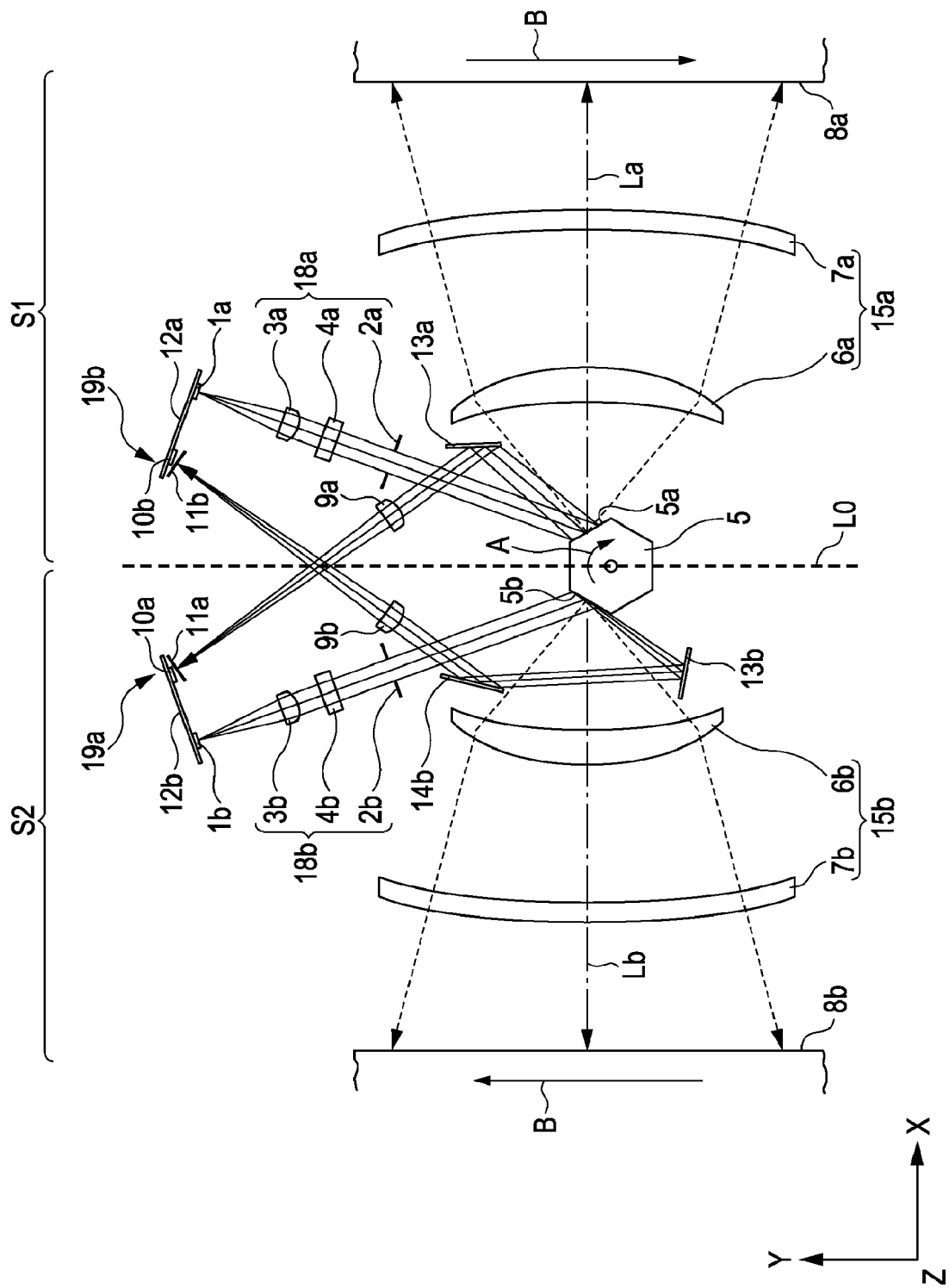
FIG. 1 is a sectional view of an optical scanning apparatus according to a first embodiment of the present invention, taken along the main scanning direction.
Figure 2:
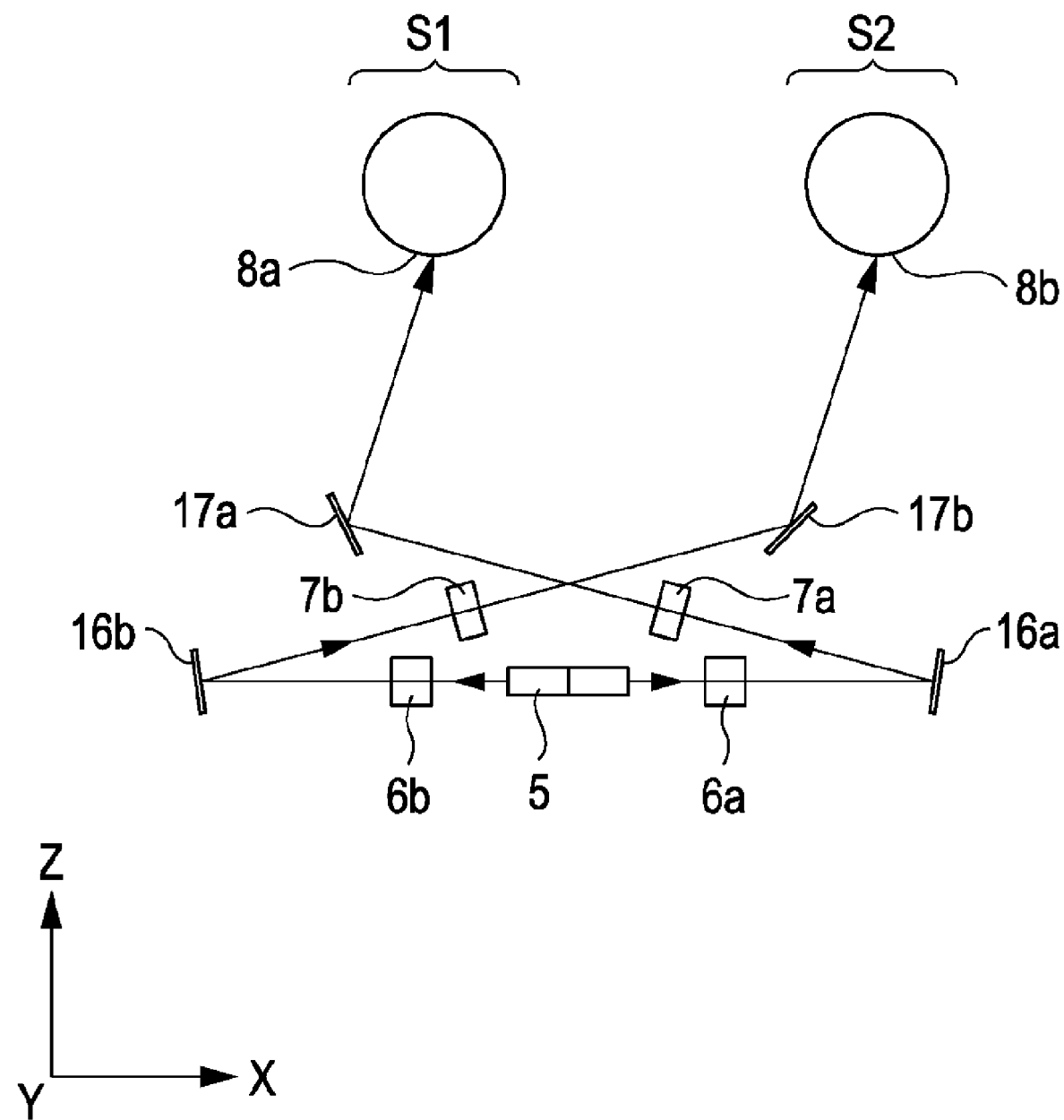
FIG. 2 is a sectional view of the optical scanning apparatus according to the first embodiment of the present invention, taken along the subscanning direction.

FIG. 1 is a sectional view of an important part of an optical scanning apparatus according to a first embodiment of the present invention, taken along the main scanning direction (main scanning sectional view). FIG. 2 is a sectional view of an important part of the optical scanning apparatus according to the first embodiment, taken along the subscanning direction (subscanning sectional view).

Herein, the "main scanning direction (Y direction)" is the direction in which the light beams deflected by the deflecting surfaces of the deflecting unit are scanned. The "subscanning direction (Z direction)" is the direction parallel to the axis of rotation of the deflecting unit. The "main scanning cross-section" is a plane normal to the subscanning direction (Z direction). The "subscanning cross-section" is a plane normal to the main scanning direction (Y direction).

In the drawings, S1 and S2 denote first and second scanning units (hereinafter also referred to as "stations"), respectively.

The structures and optical functions of the first and second scanning units S1 and S2 according to the present embodiment are substantially the same (only the number of synchronous detection mirrors, described below, is different). Thus, the following description will be given on the basis of the first scanning unit S1. The reference numerals in parenthesis denote components of the second scanning unit S2 corresponding to those of the first scanning unit S1.

The first (second) scanning unit S1 (S2) includes a light source unit 1a (1b), a first optical element 3a (3b), a second optical element 4a (4b), an aperture stop 2a (2b), and an optical deflector 5 serving as a deflecting unit. The first (second) scanning unit S1 (S2) further includes an imaging optical system 15a (15b) for focusing the light beam deflected by the optical deflector 5 to a spot on a scan surface 8a (8b).

According to the present embodiment, the first and second scanning units S1 and S2 use the same optical deflector 5. The first and second scanning units S1 and S2 use the light beams deflected and scanned (deflected and reflected) by deflecting surfaces 5a and 5b of the optical deflector 5, respectively.

The light source unit 1a (1b) emits a light beam for optical scanning. Examples of the light source unit 1a (1b) include a semiconductor laser and a light-emitting diode.

The first optical element 3a (3b) couples the light beams emitted from the light source unit 1a (1b) and converts the light beams into parallel light beams, slightly convergent light beams, or slightly divergent light beams. Hereinafter, the first optical element is referred to as a "collimator lens".

The second optical element 4a (4b) refracts the light beams coupled by the collimator lens 3a (3b) only in the subscanning direction. Hereinafter, the second optical element is referred to as a "cylindrical lens".

The aperture stop 2a (2b) determines the shape of the light beams emitted from the cylindrical lens 4a (4b).

The collimator lens 3a (3b), the cylindrical lens 4a (4b), and the aperture stop 2a (2b) constitute an incident optical system 18a (18b).

The optical deflector 5 is a rotatable polygonal mirror having six surfaces with a circumradius of 40 mm, for example. The optical deflector 5 is rotated at a constant speed by a driving unit such as a motor (not shown).

According to the present embodiment, the first and second scanning units S1 and S2 use the same optical deflector 5. The first and second scanning units S1 and S2 use the light beams deflected and scanned (deflected and reflected) by the deflecting surfaces 5a and 5b of the optical deflector 5, respectively.

The imaging optical system 15a (15b) includes a first imaging lens 6a (6b) and a second imaging lens 7a (7b), which serve as imaging optical elements. The imaging optical system 15a (15b) focuses the light beam deflected by the optical deflector 5 to a spot on the scan surface 8a (8b). The imaging optical system 15a (15b) serves a face-tangle-correction system, by making the deflecting surface 5a (5b) of the optical deflector 5 and the scan surface 8a (8b) conjugate with each other, in the subscanning cross-section. The first imaging lens 6a (6b) and the second imaging lens 7a (7b) are aspherical plastic lenses, which have high design flexibility.

The reference numeral 19a (19b) denotes a synchronous detection unit (hereinafter, a "synchronous detection optical system") of the first (second) scanning unit S1 (S2).

The synchronous detection optical system 19a (19b) includes a synchronous detection optical element (hereinafter, a "synchronous detection lens") 9a (9b) having the refractive power at least in the main scanning direction, and a synchronous detection element (hereinafter, a "synchronous detection sensor") 10a (10b). The synchronous detection optical system 19a (19b) further includes a slit (hereinafter, a "synchronous detection slit") 11a (11b) provided before the synchronous detection sensor 10a (10b), and an optical path changing unit (hereinafter, a "synchronous detection mirror") 13a (13b and 14b) for guiding the light beam that travels toward a position outside of the effective image region of the scan surface 8a (8b) to the synchronous detection sensor 10a (10b).

The light source unit 1a (1b) and the synchronous detection sensor 10b (10a) of the synchronous detection optical system 19b (19a) are provided on a circuit substrate 12a (12b).

The synchronous detection optical system 19a (19b) according to the present embodiment uses a signal from the synchronous detection sensor 10a (10b) to determine (control) the timing (the synchronous detection timing) at which the first (second) scanning unit S1 (S2) forms an image on the scan surface 8a (8b).

In the synchronous detection optical system 19a (19b), the light beam used for synchronous detection (hereinafter, a "synchronous detection light beam"), which is a part of the light beam deflected and scanned by the deflecting surface 5a (5b), is focused on the synchronous detection slit 11a (11b). The synchronous detection light beam is scanned across the synchronous detection slit 11a (11b), in the main scanning cross-section. In the subscanning cross-section, the deflecting surface 5a (5b) and the synchronous detection slit 11a (11b) are conjugated with each other. Thus, the synchronous detection optical system 19a (19b) serves as a face-tangle-correction system for the deflecting surface 5a (5b). An end of the synchronous detection slit 11a (11b) is in the shape of a knife edge (hereinafter, a "knife edge portion"). By measuring the timing at which the synchronous detection light beam is incident on the synchronous detection sensor 10a (10b), the image-forming position is determined. Because the synchronous detection light beam is focused on the synchronous detection slit 11a (11b), both in the main scanning direction and the subscanning direction, the diameter of the spot is set to be larger on the synchronous detection sensor 10a (10b) than on the synchronous detection slit 11a (11b). This minimizes irregularity in sensitivity caused by manufacturing error of the synchronous detection sensor 10a (10b) or dust deposited on the synchronous detection sensor 10a (10b).

According to the present embodiment, the scanning units S1 and S2 have the synchronous detection sensors 10a and 10b, respectively. So, each of the scanning units S1 and S2 can determine the synchronous detection timing.

In the scanning units S1 and S2, the light beams from the light source unit 1a and 1b are allowed to be incident on the optical deflector 5 from the same direction.

Although the optical scanning apparatus according to the present embodiment has two light source units, namely, 1a and 1b, the optical scanning apparatus may have more than two light source units.

The principal ray of the light beam emitted from the light source unit 1a (1b) is incident on the optical deflector 5 at an angle of 70 degrees with respect to an optical axis La (Lb) of the imaging optical system 15a (15b).

The principal ray of the light beam is the ray that passes through the center of the aperture stop 2a (2b).

Operation (optical effect) of the optical scanning apparatus according to the present embodiment will be described below.

In the first (second) scanning unit S1 (S2), a light beam is modulated in accordance with image information and emitted from the light source unit 1a (1b). The light beam is converted into a parallel light beam, a slightly convergent light beam, or a slightly divergent light beam by the collimator lens 3a (3b), and is directed to the cylindrical lens 4a (4b). In the main scanning cross-section, the light beam passes through the cylindrical lens 4a (4b).

In the subscanning cross-section, the light beam is focused on the deflecting surface 5a (5b) of the optical deflector 5, as a line image that extends in the main scanning direction. The light beam deflected and scanned by the deflecting surface 5a (5b) of the optical deflector 5 is focused to a spot on the scan surface 8a (8b) by the imaging optical system 15a (15b). By rotating the optical deflector 5 in the direction indicated by the arrow A, the beam spot is scanned over the scan surface 8a (8b) in the direction indicated by the arrow B (main scanning direction), at a constant speed. Thus, an image is formed on the scan surface 8a (8b), which is a recording medium. As used herein, the phrase "closest to the optical deflector 5" means that a component is located physically and structurally closest to the deflecting surface 5a (5b) of the optical deflector 5, and the phrase "farthest from the optical deflector 5" means that a component is located physically and structurally farthest from the deflecting surface 5a (5b) of the optical deflector 5. The physical distance means, for example, the straight-line distance between the scan surface 8a (8b) and the optical deflector 5.

Before the beam spot is scanned over the scan surface 8a (8b), the position and timing at which scanning is started are adjusted. For this purpose, A part of the light beam (synchronous detection light beam) deflected and scanned by the deflecting surface 5a (5b) of the optical deflector 5 is reflected by the synchronous detection mirror 13a (13b, 14b) to the synchronous detection sensor 10a (10b), through the synchronous detection lens 9a (9b). A light beam directed to an upper portion of the scan surface 8a (8b) with respect to the direction B in which the spot is scanned, (that is, a light beam that is directed to a portion at which image formation is started and excluded from the light beam used for image formation), is used as the synchronous detection light beam.

According to the present embodiment, the light beam is emitted from the light source unit 1a of the first scanning unit S1, and is reflected by the synchronous detection mirror 13a to the synchronous detection sensor 10a. The synchronous detection sensor 10a is arranged on the laser substrate 12b in the second scanning unit S2 located opposite the first scanning unit S1, with respect to the optical deflector 5.

Similarly, the light beam is emitted from the light source unit 1b of the second scanning unit S2, and is reflected by the synchronous detection mirrors 13b and 14b to the synchronous detection sensor 10b. The synchronous detection sensor 10b is arranged on the laser substrate 12a in the first scanning unit S1 located opposite the second scanning unit S2, with respect to the optical deflector 5.

As described above, according to the present embodiment, the synchronous detection sensor 10a (10b) and the light source unit 1b (1a) are attached to the laser substrate 12b (12a).

This reduces the number of circuit substrates. As a result, the number of wires connecting the circuit substrates and a control unit, and the area occupied by these wires, can be minimized. Thus, the size of the optical scanning apparatus can be reduced. Attachment of the synchronous detection sensor 10a (10b) to the laser substrate 12b (12a) has a secondary advantage in that, because the number of wiring connections is reduced, generation of noise is suppressed. Accordingly, the reliability of the optical scanning apparatus is further increased.

In the synchronous detection optical system 19a (19b) of the first (second) scanning unit S1 (S2), the synchronous detection light beam is deflected by the synchronous detection mirror 13a (13b, 14b) and intersects a line (hereinafter, a "center line") L0 that extends from the rotation center (deflection axis) of the optical deflector 5. The center line L0 extends perpendicular to the central axis (optical axis) La (Lb) of the imaging optical system 15a (15b), in the main scanning cross-section. The synchronous detection light beam is directed to the synchronous detection sensor 10a (10b) on the laser substrate 12b (12a), which is, with respect to the optical deflector 5, located opposite the laser substrate 12a (12b) having the light source unit 1a (1b).

The synchronous detection lens 9a (9b) and the synchronous detection sensor 10a (10b) of the synchronous detection optical system 19a (19b) are located to the right and left, respectively, of the center line L0.

In the synchronous detection optical system 19a (19b), the synchronous detection light beam is directed, across the center line L0, to the synchronous detection sensor 10a (10b) on the laser substrate 12b (12a) of the second (first) scanning unit S2 (S1). This configuration serves to increase the optical path length of the synchronous detection light beam after being reflected by the synchronous detection mirror 13a (13b, 14b), compared to the configuration in which the synchronous detection light beam is directed to the laser substrate 12a (12b) of the first (second) scanning unit S1 (S2). Thus, the surface vertex of a second surface (emergent surface) of the synchronous detection lens 9a (9b) and the synchronous detection sensor 10a (10b) can be arranged to the right and left of the center line L0, respectively. As a result, the focal length of the synchronous detection optical system 19a (19b) is further increased.

Increasing the focal length of the synchronous detection optical system 19a (19b) serves to reduce an influence of detection error made by the synchronous detection optical system 19a (19b) on the imaging optical system 15a (15b), in other words, the sensitivity of the imaging optical system 15a (15b) to detection error made by the synchronous detection optical system 19a (19b). As a result, a high quality image having minimum variation in image-forming position between the scanning units S1 and S2 can be provided.

The synchronous detection light beam reflected by the synchronous detection mirror 13a is directed, across the center line L0, to the synchronous detection sensor 10a (10b) on the laser substrate 12b (12a) of the scanning unit S2 (S1). According to the present embodiment, the synchronous detection light beam crosses the center line L0 after it is deflected and scanned by the optical deflector 5.

This structure eliminates the need to provide a reflection optical element between the light source unit and the optical deflector, which is proposed in Japanese Patent Laid-Open No. 2005-017680, and enables the synchronous detection light beam to be directed to the synchronous detection sensor on the laser substrate of the scanning unit on the opposite side.

By reducing the number of optical elements, the possibility of occurrence of error in installation can be reduced. As a result, occurrence of misregistration of irradiation position (color misregistration) between the scanning units S1 and S2 can be reduced.

Figure 3:
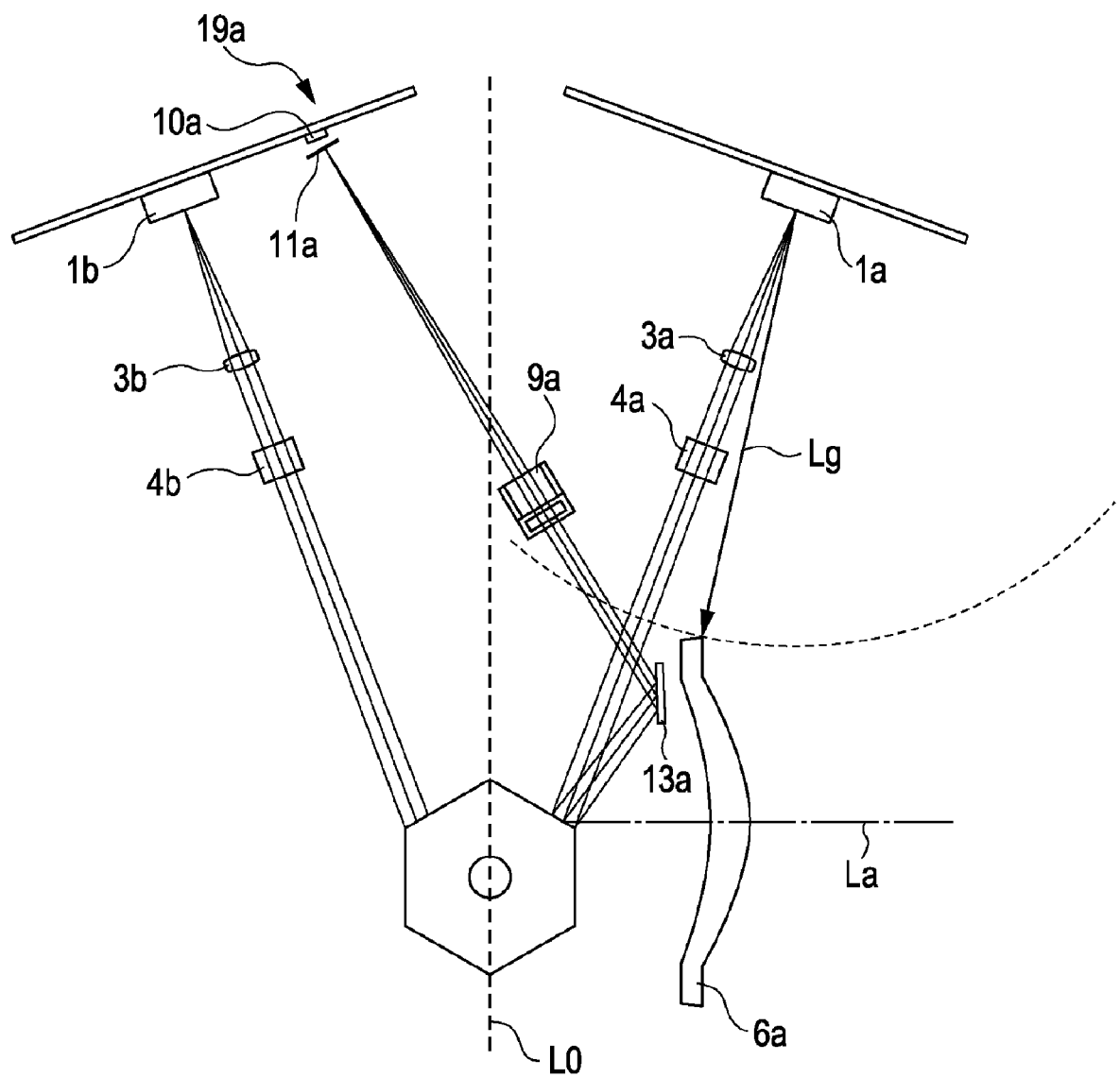
FIG. 3 is a sectional view of a synchronous detection optical system according to the first embodiment of the present invention, taken along the main scanning direction.

FIG. 3 is a schematic view of an important part of the synchronous detection optical system according to the present embodiment. In FIG. 3, for clarity's sake, only the synchronous detection light beam emitted from the light source unit 1a is illustrated. The synchronous detection light beam in the second scanning unit S2 is omitted.

To reduce an influence of detection error made by the synchronous detection optical system 19a on the imaging optical system 15a, it is desirable that Conditional Expression (1) be met.

$$0.6 \times Lg \leq fb \leq 1.2 \times Lg \qquad (1)$$

where Lg (mm) is the shortest physical distance (shortest distance) between the light source unit 1a and an external edge portion of the imaging lens 6a, and fb (mm) is the focal length of the synchronous detection lens 9a in the main scanning direction.

The lower limit of Conditional Expression (1) is a condition (numerical limitation) for preventing the sensitivity of the imaging optical system to detection error made by the synchronous detection optical system from becoming too high. The upper limit of Conditional Expression (1) is an actual condition (numerical limitation) for preventing the size of the housing of the scanning unit from becoming too large. To reduce the size of the housing of the scanning unit, it is desirable to define the range of Lg as follows:

$$50\text{mm} \leq Lg \leq 150\text{mm}$$

According to the present embodiment, the shortest physical distance, Lg, between the light source unit 1a (1b) and an external edge portion of the imaging lens 6a (6b) is 89 mm, and the focal length in a main scanning direction, fb, of the synchronous detection lens 9a (9b) in the main scanning direction is 90 mm. Thus, Conditional Expression (1) is satisfied.

It is more desirable that Conditional Expression (1) be modified as follows:

$$0.8 \times Lg \leq fb \leq 1.0 \times Lg \quad (1a)$$

In recent years, to improve the shaping stability of lenses, the imaging lens is elongated in the direction perpendicular to the optical axis of the imaging optical system (hereinafter, a "longitudinal direction of the imaging lens"), in the main scanning cross-section. As a result, if the angle between the central axis (optical axis) of the incident optical system and the optical axis of the imaging optical system (hereinafter, an "incident angle") is an acute angle in the range from 60 degrees to 70 degrees, the light beam of the incident optical system, the synchronous detection light beam, and the imaging lens easily interfere with each other because of their arrangement.

Figure 4A:
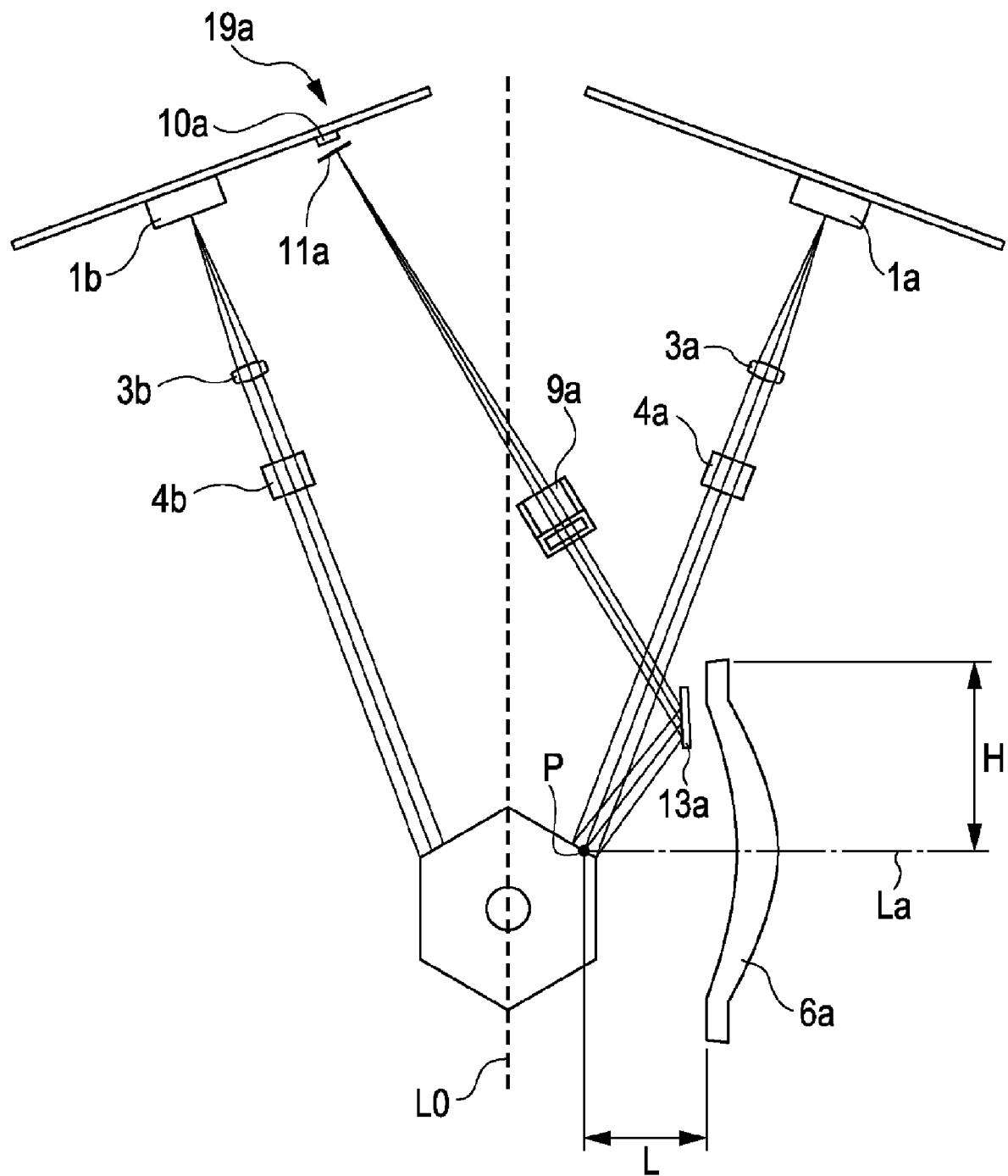
FIGS. 4A and 4B are sectional views of the synchronous detection optical system according to the first embodiment of the present invention, taken along the main scanning direction.
Figure 4B:
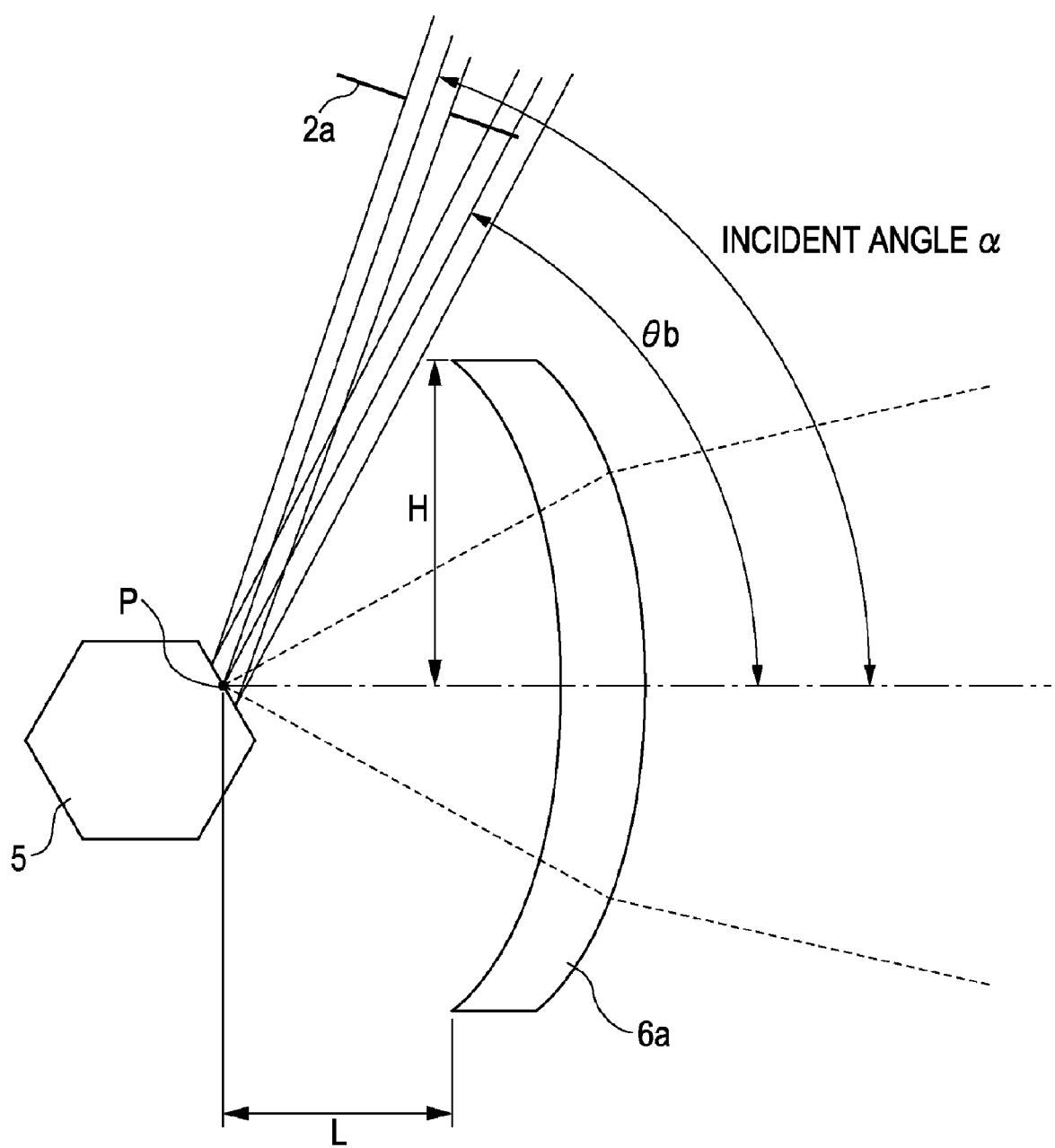

Two possible patterns of the synchronous detection optical system are shown in FIGS. 4A and 4B. In FIGS. 4A and 4B, for clarity's sake, only the synchronous detection light beam emitted from the light source unit 1a is illustrated. The synchronous detection light beam in the second scanning unit S2 is not shown.

FIG. 4B shows a pattern in which the synchronous detection light beam deflected and scanned by the optical deflector 5 travels without interfering with the imaging lens 6a. A point P is an intersecting point (axial deflection point) between the central axis of the incident optical system and the optical axis of the imaging optical system. This pattern is expressed by:

$$\tan^{-1}(H/L) \leq \theta b \leq \alpha$$

where L (mm) is a distance component obtained by breaking the line segment having the largest angle with respect to the optical axis of the imaging optical system, among line segments connecting the point P and an external edge portion of the imaging lens 6a, in the central axis direction (optical axis direction) of the imaging optical system, H (mm) is a distance component obtained by breaking the line segment in the longitudinal direction of the imaging lens, α (deg) is the incident angle, and θb (deg) is a synchronous detection angle, i.e., an angle of the principal ray of the synchronous detection light beam corresponding to the timing of synchronous detection performed on the synchronous detection element (synchronous detection sensor), among the light beam deflected and scanned by the optical deflector 5, with respect to the optical axis of the imaging lens.

However, as is clear from FIG. 4B, because the synchronous detection light beam easily interferes with another component, such as the aperture stop 2a, the arrangement flexibility is reduced. This tendency increases as the imaging lens 6a is elongated in the longitudinal direction. Accordingly, it is difficult to ensure the shaping stability of the imaging lens 6a and the arrangement flexibility at the same time.

FIG. 4A shows another pattern, in which the synchronous detection light beam deflected and scanned by the optical deflector 5 enters the imaging lens 6a, or, the synchronous detection light beam travels toward the imaging lens 6a and reflected by the synchronous detection mirror 13a.

In this configuration, the synchronous detection light beam is less likely to interfere with another component, such as the aperture stop 2a. So, the present embodiment has this configuration. FIG. 4A is a main scanning sectional view of an important part of the synchronous detection optical system having this configuration.

In FIG. 4A, if the principal ray of the synchronous detection light beam deflected and scanned by the optical deflector 5 is extended, it enters the imaging lens 6a. This arrangement is expressed by Conditional Expression (2).

$$\theta < \theta b \leq \tan^{-1}(H/L) \quad (2)$$

where θ (deg) (not shown) is the angle between the optical axis, La, of the imaging lens 6a and the principal ray of the light beam deflected and scanned by the optical deflector 5. The principal ray corresponds to an end position of the effective image region.

According to the present embodiment, θ is 39 degrees, θb is 54 degrees, L is 25.5 mm, and H is 40.7 mm. Thus, Conditional Expression (2) is satisfied.

Thus, according to the present embodiment, the synchronous detection light beam is less likely to interfere with another component, such as the aperture stop 2a. Further, it is possible to ensure the shaping stability of the imaging lens 6a and the arrangement flexibility at the same time.

A two-color image forming apparatus needs to use one optical scanning apparatus, and a four-color image forming apparatus needs to use two optical scanning apparatuses to form an image.

Figure 5:
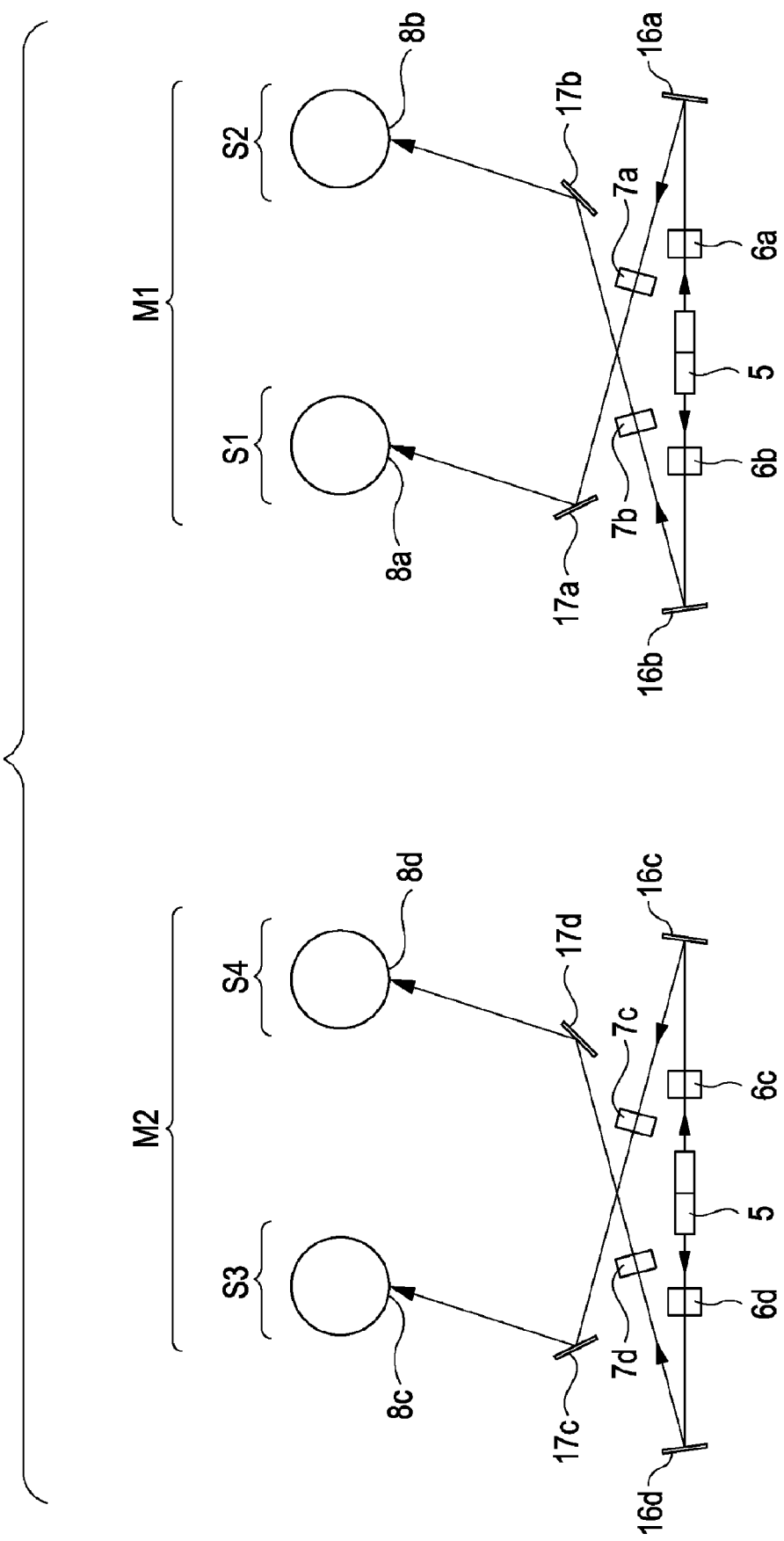
FIG. 5 is a sectional view of the optical scanning apparatus according to the first embodiment of the present invention, taken along the subscanning direction.

FIG. 5 is a schematic view of an important part of a color image forming apparatus using two optical scanning apparatuses according to the present invention. In FIG. 5, like reference numerals refer to like parts shown in FIG. 1.

In FIG. 5, two optical scanning apparatuses shown in FIG. 1 are arranged side by side. Using two optical deflectors 5, four scanning lines are produced on the surfaces of photosensitive drums 8a, 8b, 8c, and 8d.

In FIG. 5, reference numerals M1 and M2 denote first and second optical scanning apparatuses respectively. Because the structures and optical functions of the first and second optical scanning apparatuses M1 and M2 are the same, the following description will be given on the basis of the first optical scanning apparatus M1. The reference numerals in parenthesis denote components of the second optical scanning apparatus M2 corresponding to those of the first optical scanning apparatus M1.

In FIG. 5, two light beams deflected by the polygonal mirror (optical deflector) 5 pass through the first imaging lenses 6a and 6b (6c and 6d) and are incident on first reflecting mirrors 16a and 16b (16c and 16d) at an incident angle of seven degrees. Then, the light beams pass through second imaging lenses 7a and 7b (7c and 7d) and one of the light beams is incident on a second reflecting mirror 17a (17c) at an incident angle of 42 degrees, and the other one of the light beams is incident on a third reflecting mirror 17b (17d) at an incident angle of 62 degrees. The light beams are then directed to the surfaces of the photosensitive drums 8a and 8b (8c and 8d).

As described above, in FIG. 5, the optical scanning apparatuses M1 and M2 are arranged side by side. Using two optical deflectors 5, four scanning lines are produced on the surfaces of the photosensitive drums 8a, 8b, 8c, and 8d, to record color image information.

According to the present embodiment, although the cylindrical lenses 4a and 4b of the first and second scanning units S1 and S2 are independently provided, the cylindrical lenses 4a and 4b may be integrally formed using, for example, a plastic mold. In the first (second) scanning unit S1 (S2), the light beam emitted from the light source unit 1a (1b) may be directly guided to the optical deflector 5 (rotatable polygonal mirror) through the aperture stop 2a (2b) without using the collimator lens 3a (3b) and the cylindrical lens 4a (4b). Although the imaging optical system 15a (15b) according to the present embodiment consists of two imaging lenses, it may consist of a single imaging lens or more than two imaging lenses. Although the polygonal mirror according to the present embodiment has six deflecting surfaces, a polygonal mirror having at least three deflecting surfaces (for example, four, five, or seven deflecting surfaces) is equally effective.

Although the synchronous detection optical element 9a (9b) according to the present embodiment has a refractive power in the main scanning direction, it may have a refractive power in the subscanning direction. The synchronous detection optical element 9a (9b) does not necessarily have to consist of a single lens, but it may consist of a plurality of lenses.

Although the deflecting unit 5 according to the present embodiment is a rotatable polygonal mirror, it may be a reciprocal deflecting element having two mirror surfaces pivotable about a pivot axis to deflect and scan (deflect and reflect) a light beam to scan a scan surface.

According to the present embodiment, the light beams from the same direction are allowed to be incident on the deflecting surfaces not adjoining each other. However, the same effect is obtained even in the case where light beams from different directions are allowed to be incident on the deflecting surfaces, or where light beams are allowed to be incident on the deflecting surfaces adjoining each other.

Although the optical deflector 5 according to the present embodiment is rotated clockwise, it may be rotated counterclockwise. Even in such a case, a light beam directed to an upper portion of the scan surface 8a (8b), with respect to the direction B in which the spot is scanned, that is, a light beam that is directed to a portion at which image formation is started, and excluded from the light beam used for image formation, is used as the synchronous detection light beam.

As described above, the optical scanning apparatus according to the present embodiment has two deflecting surfaces, which contributes to a reduction in size of the optical scanning apparatus. Further, an influence of synchronous detection error on the imaging optical system (sensitivity) is reduced. As a result, occurrence of variation in image-forming position between the scanning units S1 and S2 is reduced, and a high quality image can be provided.

Second Embodiment

Figure 6:
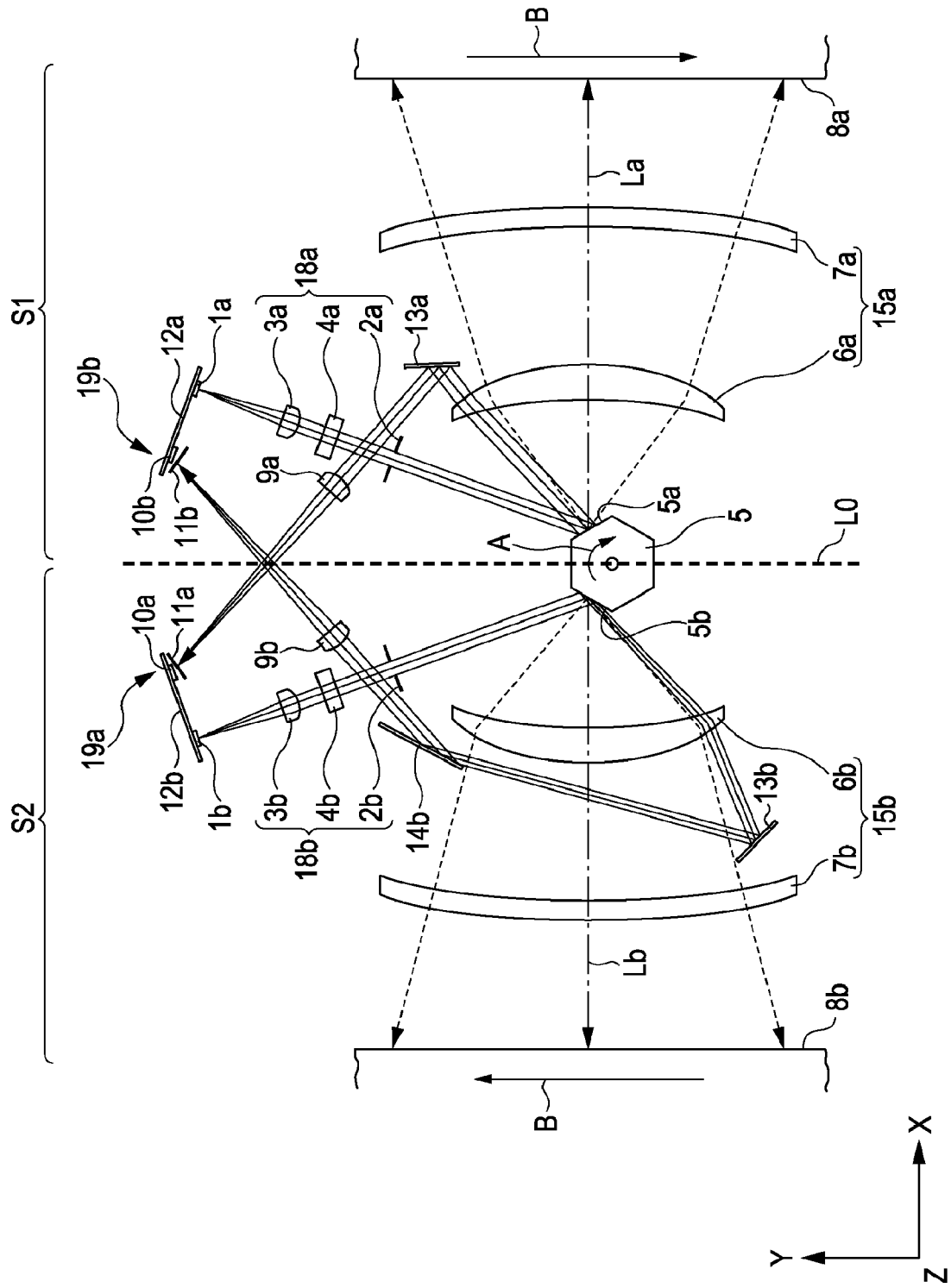
FIG. 6 is a sectional view of an optical scanning apparatus according to a second embodiment of the present invention, taken along the main scanning direction.

FIG. 6 is a main scanning sectional view of an important part of an optical scanning apparatus according to a second embodiment of the present invention. In FIG. 6, like reference numerals refer to like parts shown in FIG. 1.

Because structures and optical functions of the first and second scanning units S1 and S2 according to the present embodiment are substantially the same, the following description will be given on the basis of the first scanning unit S1. The reference numerals in parenthesis denote components of the second scanning unit S2 corresponding to those of the first scanning unit S1.

The optical scanning apparatus according to the present embodiment is different from that according to the first embodiment in that the synchronous detection mirror 13a (13b, 14b) is arranged between the first imaging lens 6a (6b) and the scan surface 8a (8b). Because the other structures and optical functions of the optical scanning apparatus according to the present embodiment are the same as those according to the first embodiment, the optical scanning apparatus according to the present embodiment has the same effect as that according to the first embodiment.

According to the present embodiment, a synchronous detection light beam deflected and scanned by the deflecting surface 5a (5b) of the optical deflector 5 passes through the imaging lens 6a (6b) at a portion outside of an effective scanning region. The synchronous detection light beam is reflected by the synchronous detection mirror 13a (13b, 14b) and directed to the synchronous detection sensor 10a (10b) on the laser substrate 12b (12a) of the second (first) scanning unit S2 (S1), which is located opposite the first (second) scanning unit S1 (S2).

According to the present embodiment, the synchronous detection slit 11a (11b) is arranged at a position optically equivalent to the position of the scan surface 8a (8b). To reduce an influence of detection error made by the synchronous detection optical system 19a (19b) on the imaging optical system 15a (15b), it is desirable that Conditional Expression (3) be met.

$$0.6 \times Lg \leq fg \leq 8.0 \times Lg \tag{3}$$

where Lg is the shortest distance among line segments connecting the light source unit 1a (1b) and an external edge portion of the imaging lens 6a (6b), and fg is the combined focal length in a main scanning direction of the imaging lens 6a (6b) and the synchronous detection lens 9a (9b) in the main scanning direction.

The lower limit of Conditional Expression (3) is a condition (numerical limitation) for preventing the sensitivity of the imaging optical system to detection error made by the synchronous detection optical system from becoming too high. The upper limit of Conditional Expression (3) is an actual condition (numerical limitation) for preventing the size of the housing of the scanning unit from becoming too large. To reduce the size of the housing of the scanning unit, it is desirable to define the range of Lg as follows:

$$50 \text{mm} \leq Lg \leq 150 \text{mm}$$

The combined focal length in a main scanning direction fg is obtained as follows: For simplicity's sake, the following description will be given on the basis of the synchronous detection optical system 19a of the first scanning unit S1.

Figure 7A:
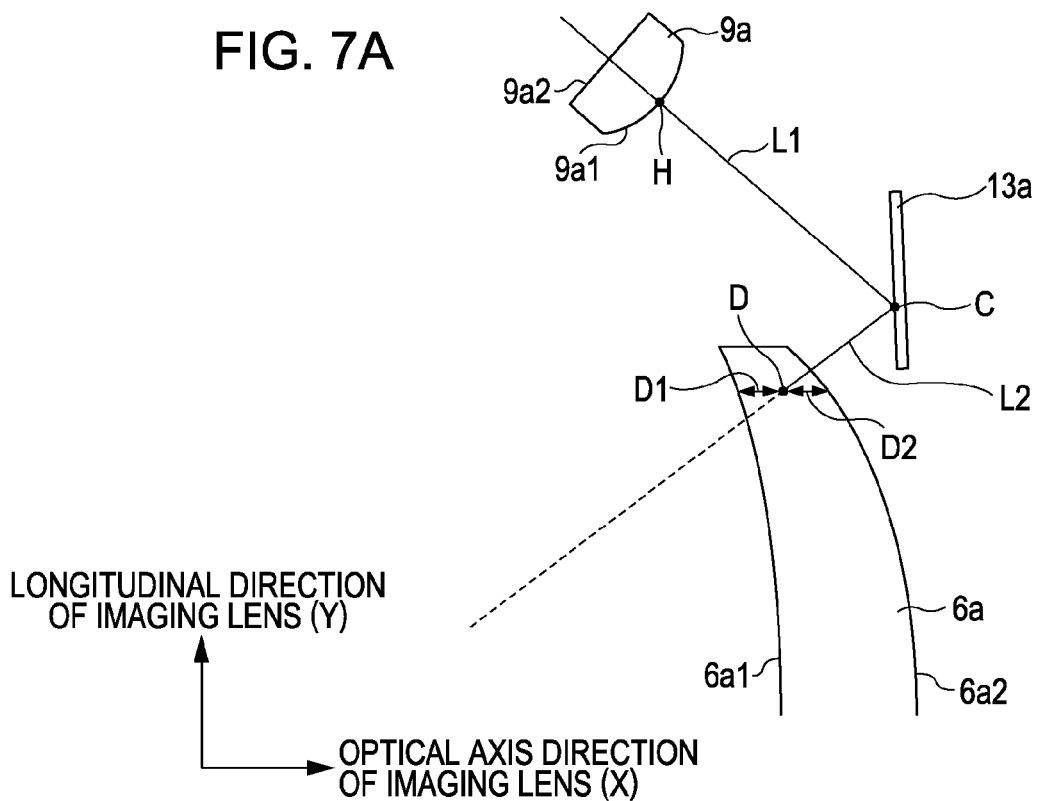
FIGS. 7A to 7D show how to find the combined focal length, according to the second embodiment of the present invention.

FIG. 7A is a schematic view showing, in the first scanning unit S1, the synchronous detection light beam deflected and scanned by the optical deflector 5 passes through the imaging lens 6a and reflected by the synchronous detection mirror 13a to the synchronous detection sensor 10a.

In FIG. 7A, the surface of the synchronous detection mirror 13a and a straight line L1 connecting the knife edge portion of the synchronous detection slit (not shown) and the center of the synchronous detection lens 9a, i.e., the principal ray of the synchronous detection light beam reflected by the synchronous detection mirror 13a, meet at a point C.

The straight line formed by reflecting the straight line L1 by the surface of the synchronous detection mirror 13a is denoted by L2. Among any points existing on the straight line L2, the point that meets the following relationship is denoted by a point D.

$$D1 = D2$$

where D1 is the distance between the point D and a first surface 6a1 of the imaging lens 6a, and D2 is the distance between the point D and a second surface 6a2 of the imaging lens 6a, in the optical axis direction of the imaging lens 6a.

Figure 7B:
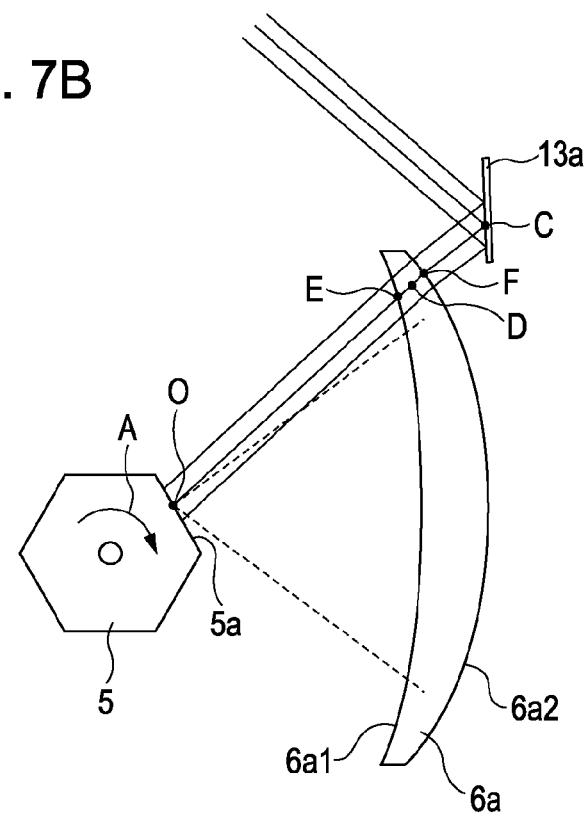

In FIG. 7B, the first surface 6a1 of the imaging lens 6a and a line segment connecting the point D and an axial deflection point O meet at a point E. The second surface 6a2 of the imaging lens 6a and a line segment connecting the point D and the point C meet at a point F.

For convenience's sake, in calculating the combined focal length, the principal ray of the synchronous detection light beam is directed to the synchronous detection mirror 13a (the point C) via, in sequence, the axial deflection point O, the point E, the point D, and the point F.

The curvature radius in the main scanning direction at the point E, which is the intersecting point between the principal ray of the synchronous detection light beam and the first surface 6a1 of the imaging lens 6a, is obtained as follows.

Figure 7C:
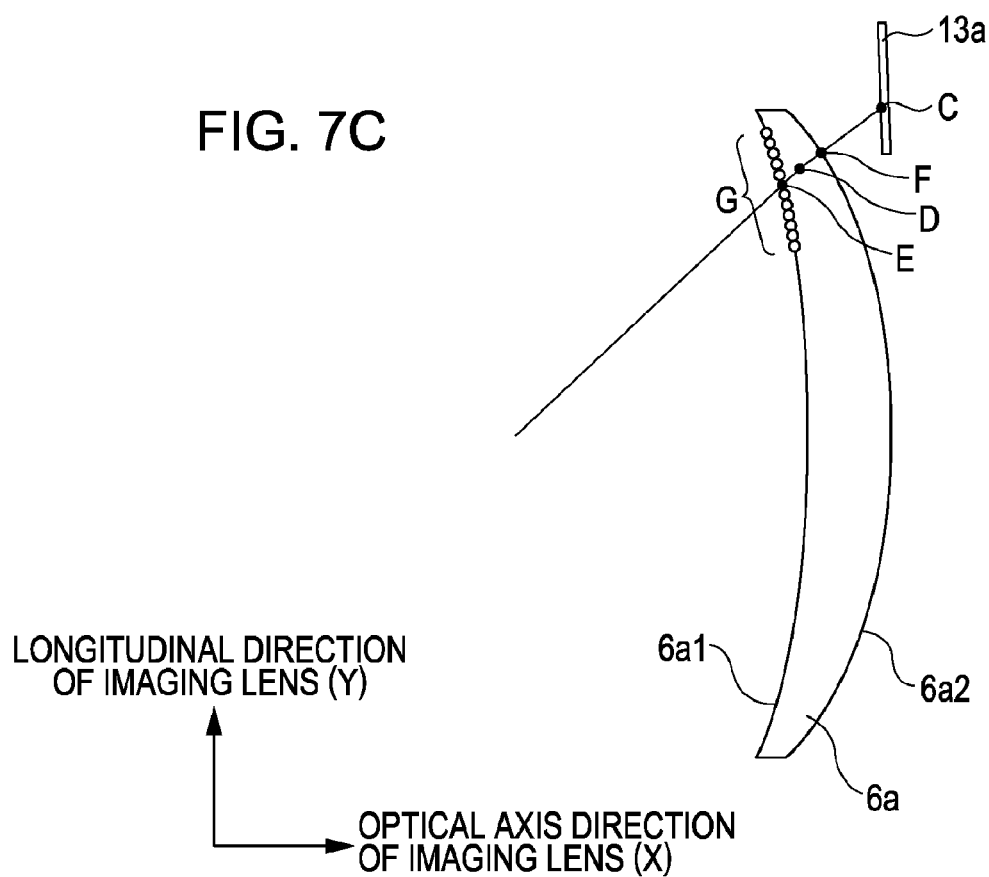

Referring to FIG. 7C, which is a schematic view showing how to obtain the curvature radius in the main scanning direction, five 0.5 mm-apart points are plotted on each side of the point E (in the plus and minus directions), along the first surface 6a1 of the imaging lens 6a. The eleven points constitute a point sequence G.

Figure 7D:
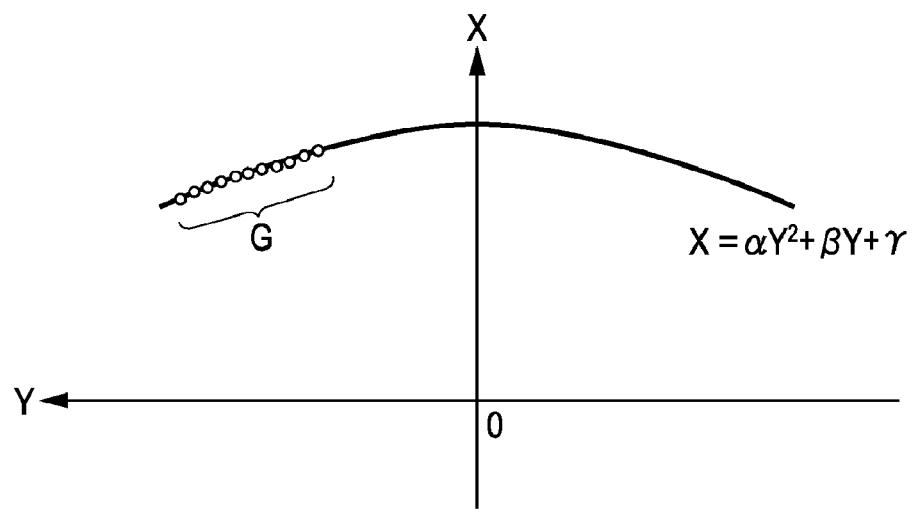

The point sequence G is polynomial-approximated by the following quadratic function (refer to FIG. 7D):

$$X = \alpha Y^2 + \beta Y + \gamma$$

After the point sequence G is polynomial-approximated, the local curvature radius r1 at the point E, in the main scanning cross-section, is given by:

$$r1 = \frac{\left\{1 + \left(\frac{dX}{dY}\right)^2\right\}^{\frac{3}{2}}}{\left(\frac{d^2X}{dY^2}\right)} \quad \text{[Expression 1]}$$

Similarly, a local curvature radius r2 at the point F, in the main scanning cross-section, can be obtained by plotting a point sequence around the point F, at which the principal ray passes through the second surface 6a2 of the imaging lens 6a, and by using polynomial approximation.

The focal length fs in the main scanning direction of the imaging lens 6a, at the region through which the synchronous detection light beam passes, is given, according to paraxial theory, by:

$$fs = \frac{1}{\varphi 1 + (1 - e1' \cdot \varphi 1) \cdot \varphi 2} \quad \text{[Expression 2]}$$

$$\begin{cases} \varphi 1 = \dfrac{N-1}{r1} \\ \varphi 2 = \dfrac{1-N}{r2} \\ e1' = \dfrac{|EF|}{N} \end{cases}$$

where N is the refractive index of the material of the imaging lens 6a, and |EF| is the length of the line segment connecting the point E and the point F.

The combined focal length, fg, of the imaging lens 6a and the synchronous detection lens 9a, according to the present embodiment, is given by:

$$fg = \frac{fs \times fb}{fs + fb - (|FC| + |CH|)} \quad \text{[Expression 3]}$$

where H is an intersecting point between a first surface 9a1 of the synchronous detection lens 9a and the principal ray L1 of the synchronous detection light beam reflected by the synchronous detection mirror 13a.

Parameters associated with the arrangement and optical characteristics of the components of the optical systems according to the present embodiment are as follows:

r1=−120 mm r2=−60 mm

N=1.531

|EF|=6 mm

|FC|=30 mm

|CH|=65 mm fb=90 mm

Lg=89 mm

Therefore, the combined focal length, fg, of the imaging lens 6a and the synchronous detection lens 9a, in the main scanning direction, is 92.1. Thus, Conditional Expression (3) is satisfied.

Concerning values of the second scanning unit S2, only the optical path length between lenses, which is represented by |FC|+|CH| in the numerical expression for defining the combined focal length, fg, is changed to 270 mm. Other values are the same as those of the first scanning unit S1.

In the second scanning unit S2, the combined focal length, fg, of the imaging lens 6b and the synchronous detection lens 9b, in the main scanning direction, is 511.7. Thus, Conditional Expression (3) is satisfied.

It is more desirable that Conditional Expression (3) be modified as follows:

$$0.8 \times Lg \leq fg \leq 7.0 \times Lg \quad (3a)$$

Similarly to the optical scanning apparatus according to the first embodiment, in the optical scanning apparatus according to the present embodiment, in the first (second) scanning unit S (S2), the surface vertex of the second surface 9a2 of the synchronous detection lens 9a (9b) and the synchronous detection sensor 10a (10b) are arranged to the right and left of the center line L0 respectively.

By making the combined focal length, fg, of the synchronous detection lens 9a (9b) and the imaging lens 6a (6b) serve as the focal length of the synchronous detection optical system 19a (19b), the focal length is increased. This is a specific advantage of the present embodiment. Accordingly, an influence of detection error made by the synchronous detection optical system 19a (19b) on the imaging optical system 15a (15b) is further reduced relative to the case of the first embodiment.

Third Embodiment

Figure 8:
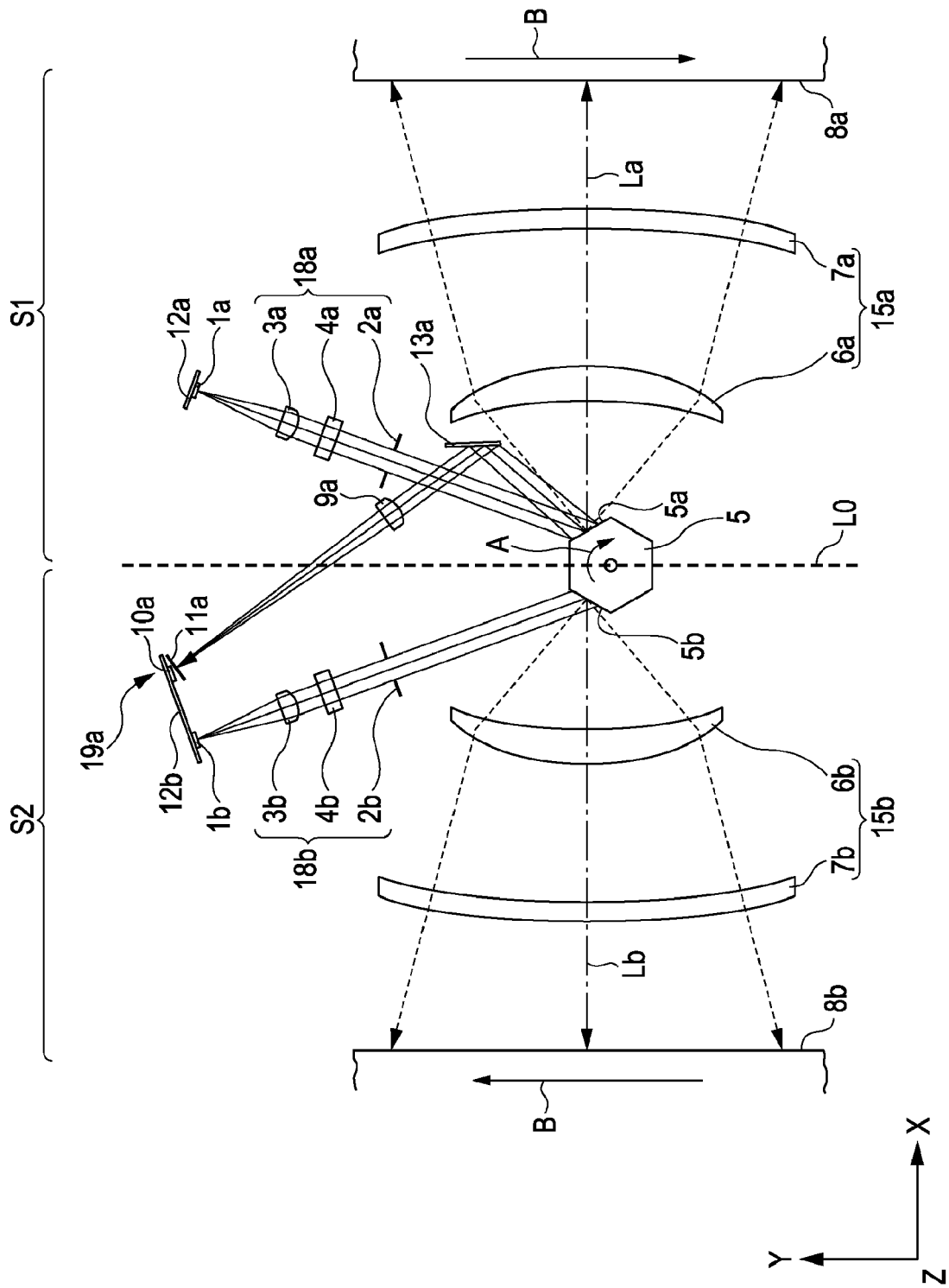
FIG. 8 is a sectional view of an optical scanning apparatus according to a third embodiment of the present invention, taken along the main scanning direction.

FIG. 8 is a main scanning sectional view of an important part of an optical scanning apparatus according to a third embodiment of the present invention. In FIG. 8, like reference numerals refer to like parts shown in FIG. 1.

The optical scanning apparatus according to the present embodiment is different from that according to the first embodiment in that the synchronous detection optical system is provided in only one of the first and second scanning units S1 and S2. Because the other structures and optical functions of the optical scanning apparatus according to the present embodiment are the same as those according to the first embodiment, the optical scanning apparatus according to the present embodiment has the same effect as that according to the first embodiment.

According to the present embodiment, only the first scanning unit S1 has the synchronous detection optical system 19a.

Parameters associated with the arrangement and optical characteristics of the components of the optical systems according to the present embodiment are the same as those according to the first embodiment.

According to the present embodiment, although the synchronous detection optical system 19a for synchronous detection is provided in the first scanning unit S1, the synchronous detection optical system 19b for synchronous detection may be provided only in the second scanning unit S2. In such a case, like the synchronous detection optical system 19b shown in FIG. 1, two synchronous detection mirrors need to be arranged so that synchronous detection can be performed using the light beam directed to an upper portion of the scan surface 8a (8b) with respect to the direction B (refer to FIG. 1).

An advantage of the optical scanning apparatus according to the present embodiment is that the optical scanning apparatus is simplified by reducing to half the number of synchronous detection optical systems used in one optical scanning apparatus compared to that according to the first embodiment.

Fourth Embodiment

Figure 9:
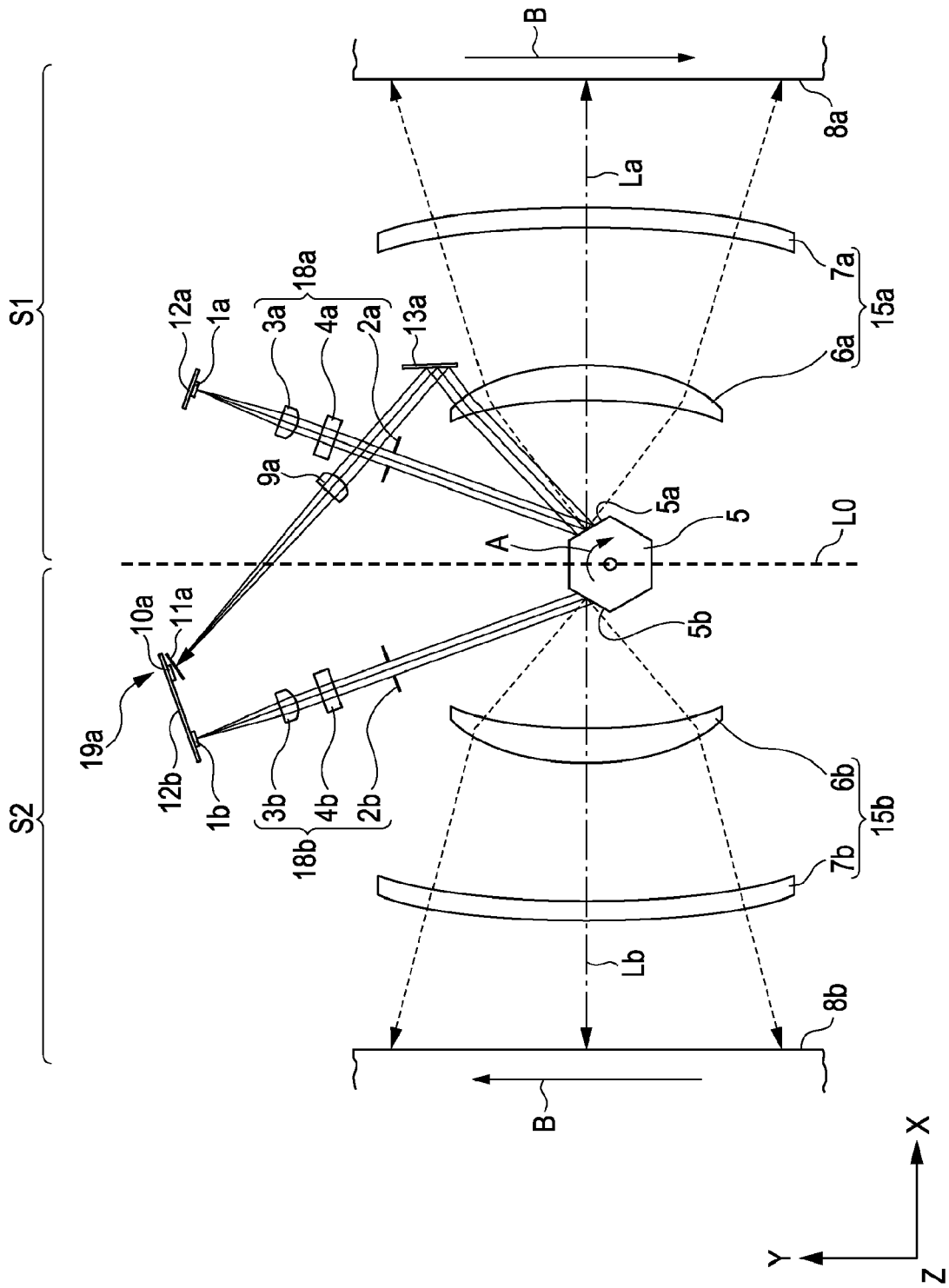
FIG. 9 is a sectional view of an optical scanning apparatus according to a fourth embodiment of the present invention, taken along the main scanning direction.

FIG. 9 is a main scanning sectional view of an important part of an optical scanning apparatus according to a fourth embodiment of the present invention. In FIG. 9, like reference numerals refer to like parts shown in FIG. 1.

The optical scanning apparatus according to the present embodiment is different from that according to the second embodiment in that the synchronous detection optical system is provided in only one of the first and second scanning units S1 and S2. Because the other structures and optical functions of the optical scanning apparatus according to the present embodiment are the same as those according to the first embodiment, the optical scanning apparatus according to the present embodiment has the same effect as that according to the first embodiment.

According to the present embodiment, only the first scanning unit S1 has the synchronous detection optical system 19a.

Parameters associated with the arrangement and optical characteristics of the components of the optical systems according to the present embodiment are the same as those according to the second embodiment.

According to the present embodiment, the synchronous detection is performed by the synchronous detection optical system 19a of the first scanning unit S1. However, the synchronous detection optical system 19b may be provided only in the second scanning unit S2, to perform synchronous detection. In such a case, similarly to the synchronous detection optical system 19b shown in FIG. 6, two synchronous detection mirrors are arranged to enable synchronous detection to be performed at the upstream side of the image-forming position (refer to FIG. 6).

An advantage of the optical scanning apparatus according to the present embodiment is that the optical scanning apparatus is simplified by reducing to half the number of synchronous detection optical systems used in one optical scanning apparatus compared to that according to the second embodiment.

Fifth Embodiment

Figure 10:
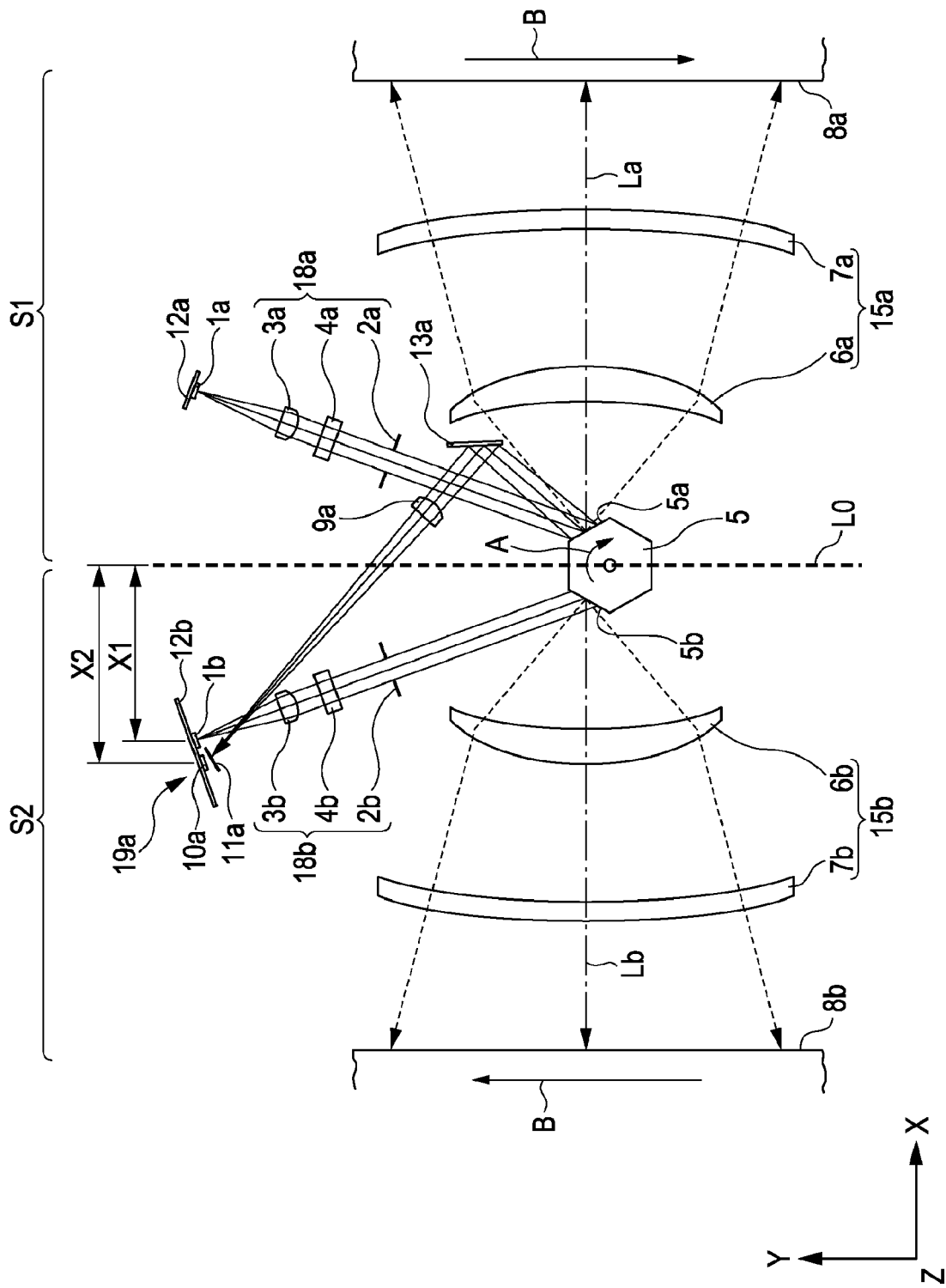
FIG. 10 is a sectional view of an optical scanning apparatus according to a fifth embodiment of the present invention, taken along the main scanning direction.

FIG. 10 is a main scanning sectional view of an important part of an optical scanning apparatus according to a fifth embodiment of the present invention. In FIG. 10, like reference numerals refer to like parts shown in FIG. 1.

The optical scanning apparatus according to the present embodiment is different from those according to the first to fourth embodiments in the arrangement of the light source unit 1b and the synchronous detection sensor 10a on the laser substrate 12b. Because the other structures and optical functions of the optical scanning apparatus according to the present embodiment are the same as those according to the first to fourth embodiments, the optical scanning apparatus according to the present embodiment has the same effect as those according to the first to fourth embodiments. In FIG. 10, for clarity's sake, only the synchronous detection light beam emitted from the light source unit 1a is illustrated. The synchronous detection light beam in the second scanning unit S2 is omitted.

Referring to FIG. 10, the synchronous detection light beam reflected by the synchronous detection mirror 13a intersects the light beam emitted from the light source unit 1b of the second scanning unit S2, and is directed to the synchronous detection sensor 10a.

At this time, Conditional Expression 4.

$$X1<X2 \qquad \text{[Condition Expression 4]}$$

where X1 is the distance between the light source unit 1b and the center line L0 in the optical axis direction (X axis direction) of the imaging optical system 15a, and X2 is the distance between the synchronous detection sensor 10a and the center line L0 in the optical axis direction (X axis direction) of the imaging optical system 15a. According to the present embodiment, X1 is 61 mm, and X2 is 82 mm. Thus, Conditional Expression 4 is satisfied.

An advantage of the optical scanning apparatus according to the present embodiment is that the distance between the synchronous detection lens 9a and the synchronous detection sensor 10a is further increased. Accordingly, an influence of detection error made by the synchronous detection optical system 19a (19b) on the imaging optical system 15a (15b) is further reduced.

Although it is not illustrated in FIG. 10, the arrangement of the synchronous detection sensor 10b and the light source unit 1a of the second scanning unit S2 is the same as that of the first scanning unit S1.

Sixth Embodiment

A sixth embodiment of the present invention will be described below.

The optical scanning apparatus according to the present embodiment is different from those according to the first to fifth embodiments in that the laser substrate 12a in the first scanning unit S1 and the laser substrate 12b in the second scanning unit S2 are integrally formed. Because the other structures and optical functions of the optical scanning apparatus according to the present embodiment are the same as those according to the first to fifth embodiments, the optical scanning apparatus according to the present embodiment has the same effect as those according to the first to fifth embodiments.

According to the present embodiment, by integrally forming the laser substrate 12a in the first scanning unit S1 and the laser substrate 12b in the second scanning unit S2, the number of components is reduced. As a result, the optical scanning apparatus is reduced in size and simplified in structure.

Seventh Embodiment

Figure 11:
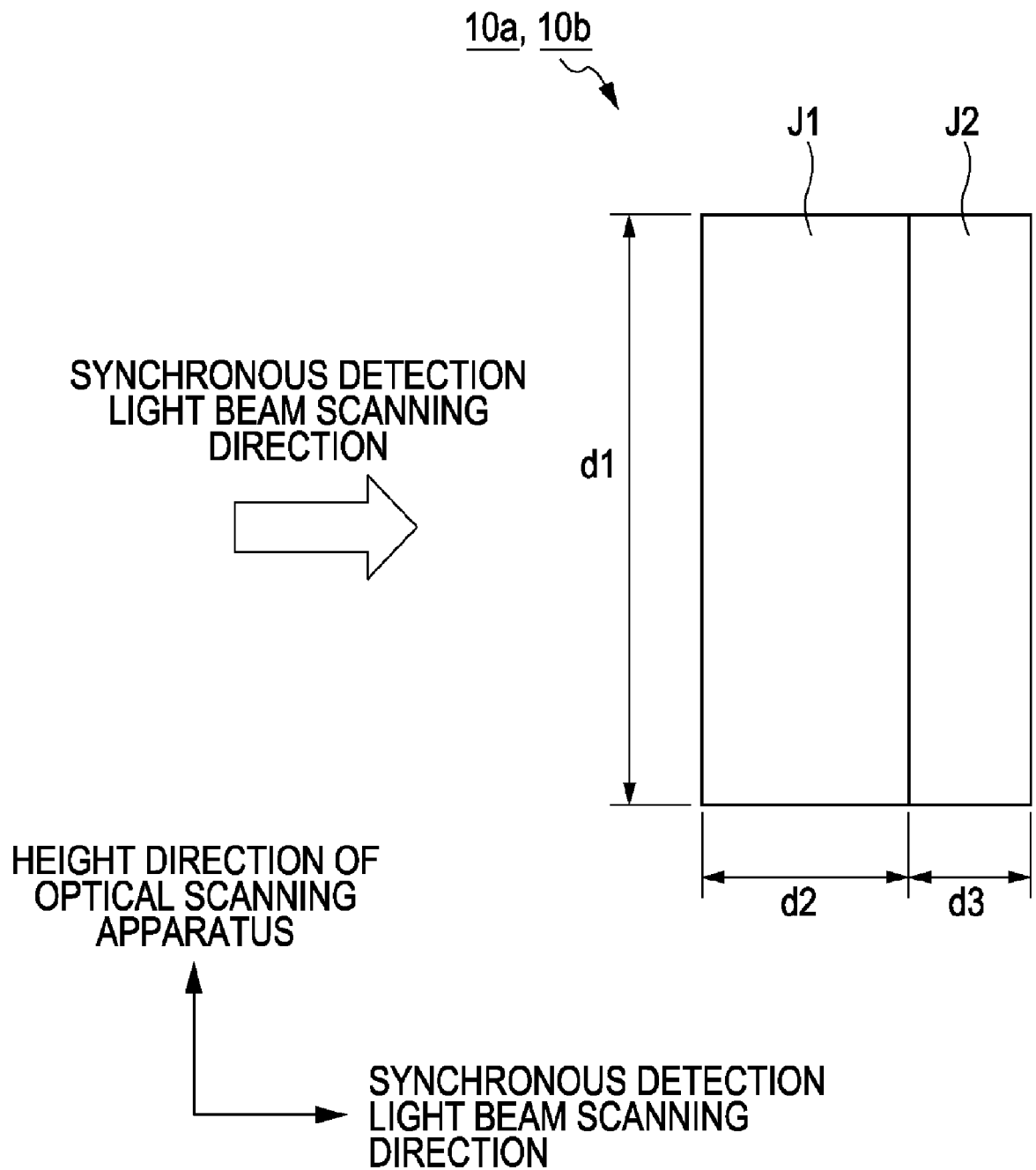
FIG. 11 shows a light detecting surface of a synchronous detection sensor according to a seventh embodiment of the present invention.

FIG. 11 is a sectional view of an important part of a light detecting surface of a synchronous detection element according to a seventh embodiment of the present invention.

The optical scanning apparatus according to the present embodiment is different from those according to the first to sixth embodiments in that a synchronous detection sensor 10a (10b) having two light detecting surfaces is used as the synchronous detection element, and hence, the number of the synchronous detection slits is reduced. Because the other structures and optical functions of the optical scanning apparatus according to the present embodiment are the same as those according to the first to sixth embodiments, the optical scanning apparatus according to the present embodiment has the same effect as those according to the first to sixth embodiments.

Referring to FIG. 11, according to the present embodiment, the synchronous detection sensor 10a (10b) includes two light detecting surfaces J1 and J2. The light detecting surfaces J1 and J2 are arranged side by side in the direction in which the synchronous detection light beam is scanned over the synchronous detection sensor 10a (10b).

A method for detecting the synchronous detection timing with the synchronous detection sensor 10a (10b) according to the present embodiment will be described below. When the synchronous detection light beam is scanned in the direction shown in FIG. 11, the synchronous detection light beam first reaches the light detecting surface J1, and then the light detecting surface J2. Thus, when the quantities of light captured time-sequentially by these light detecting surfaces J1 and J2 are compared, there is a timing at which the quantities of light captured by the light detecting surfaces J1 and J2 are equal. According to the present embodiment, this timing is referred to as the synchronous detection timing.

An advantage of the optical scanning apparatus according to the present embodiment is that, because the number of the synchronous detection slits is reduced, the optical scanning apparatus is reduced in size and simplified in structure. In addition, in the synchronous detection element according to the present embodiment, the synchronous detection timing is determined independently of the scanning speed of the synchronous detection light beam. Therefore, the synchronous detection element according to the present embodiment has higher synchronous detection accuracy than the synchronous detection slits.

Although the light source unit according to the first to seventh embodiments includes a single light-emitting portion, the light source unit may include a multibeam semiconductor laser having a plurality of light-emitting portions (i.e., multibeam light source).

An advantage of the multibeam light source is that it makes high-speed printing and high-definition printing possible without requiring acceleration of the optical deflector, which produces noise and vibration.

Image Forming Apparatus

Figure 12:
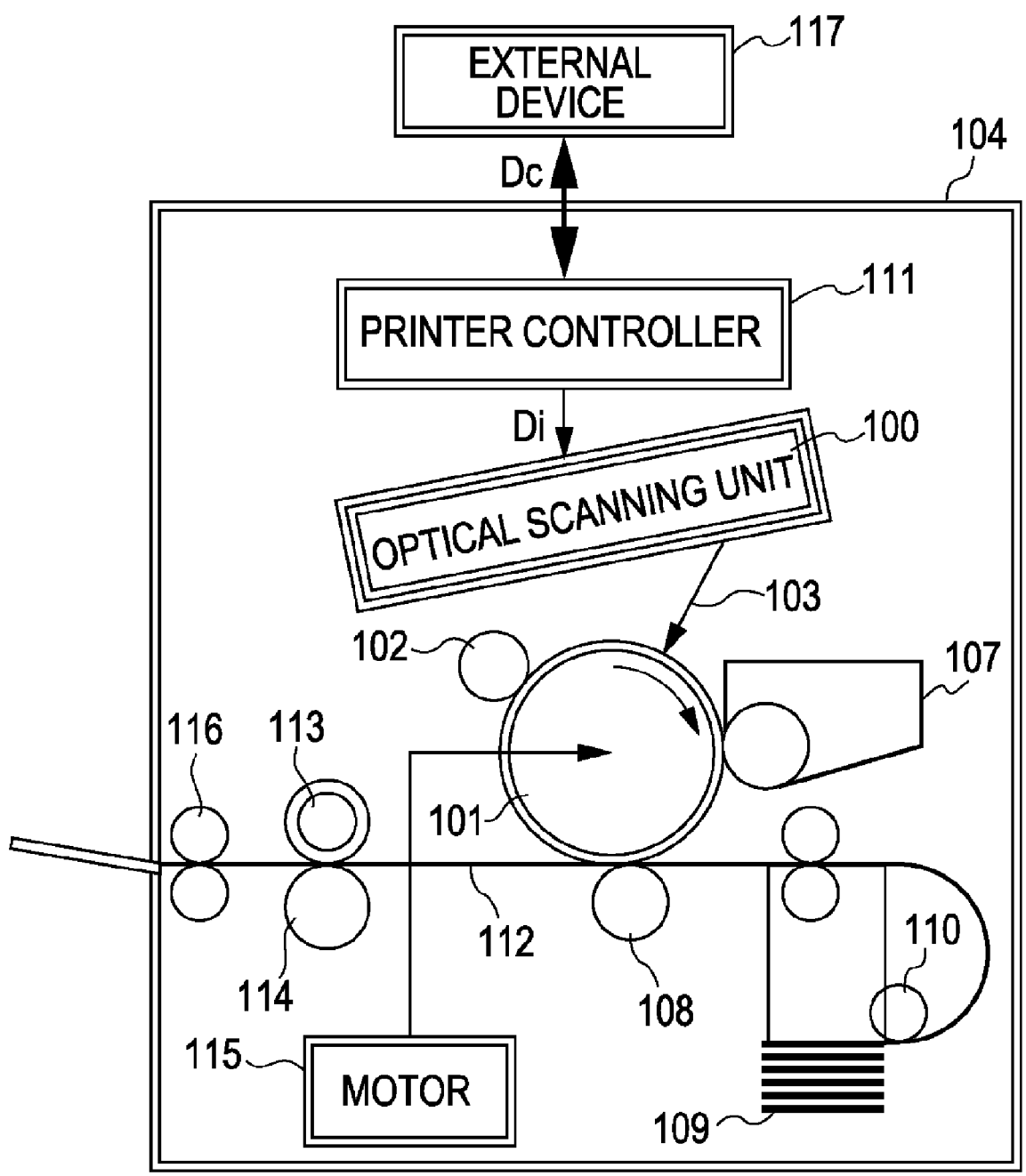
FIG. 12 is a schematic view of an important part of an image forming apparatus according to an embodiment of the present invention.

FIG. 12 is a sectional view of an important part of an image forming apparatus according to an embodiment of the present invention taken along the subscanning direction. An external device 117, such as a personal computer, sends code data Dc to an image forming apparatus 104. The code data Dc is converted into image data (dot data) Di by a printer controller 111 in the image forming apparatus. The image data Di is input to the optical scanning unit 100 having the structure according to any one of the first to seventh embodiments. The optical scanning unit 100 emits a light beam 103 modulated in accordance with the image data Di. The light beam 103 is scanned over the photosensitive surface of the photosensitive drum 101 in the main scanning direction.

The photosensitive drum 101 serving as an electrostatic latent image bearing member (photosensitive body) is rotated clockwise by a motor 115. As the photosensitive drum 101 is rotated, the photosensitive surface thereof moves relative to the light beam 103 in the subscanning direction, which is orthogonal to the main scanning direction. A charging roller 102 for uniformly charging the surface of the photosensitive drum 101 is provided above the photosensitive drum 101, such that it contacts the photosensitive drum 101. The surface of the photosensitive drum 101 charged by the charging roller 102 is irradiated with the light beam 103 emitted by the optical scanning unit 100.

As described above, the surface of the photosensitive drum 101 is irradiated with the light beam 103, which has been modulated in accordance with the image data Di. Thus, an electrostatic latent image is formed on the photosensitive drum 101. A developing unit 107 is arranged downstream, with respect to the rotation direction, of the position where the photosensitive drum 101 is irradiated with the light beam 103, such that it contacts the photosensitive drum 101. The developing unit 107 develops the electrostatic latent image as a toner image.

A transfer roller 108 is arranged downstream of the photosensitive drum 101 such that it faces the photosensitive drum 101. The toner image developed by the developing unit 107 is transferred to a sheet 112, serving as a recording material, in a transfer section. The sheet 112 is stored in a sheet cassette 109 located before (in FIG. 12, on the right side of) the photosensitive drum 101. The sheet 112 may be manually fed. A feeding roller 110 is arranged at an end of the sheet cassette 109 so that the feeding roller 110 feeds the sheet 112 in the sheet cassette 109 into the conveying path.

The sheet 112 carrying the unfixed toner image is conveyed to a fixing unit located after (in FIG. 12, on the left side of) the photosensitive drum 101. The fixing unit includes a fixing roller 113 having a fixing heater (not shown) therein, and a pressure roller 114 pressed against the fixing roller 113. The sheet 112 conveyed from the transfer section is caused to pass between the fixing roller 113 and the pressure roller 114 while being heated. Thus, the unfixed toner image on the sheet 112 is fixed. A paper-output roller 116 is located after the fixing roller 113. The sheet 112 after image-fixing is output from the image forming apparatus 104.

Although it is not illustrated in FIG. 12, the printer controller 111 not only converts data, as described above, but also controls the components in the image forming apparatus, such as the motor 115 and a below-described polygonal motor (not shown) in the optical scanning unit 100.

The recording density of the image forming apparatus of the present invention is not specifically limited. However, because the required image quality becomes higher as the recording density increases, the structure according to the first to third embodiments of the present invention is effective in image forming apparatuses having a recording density of at least 1200 dpi.

Color Image Forming Apparatus

Figure 13:
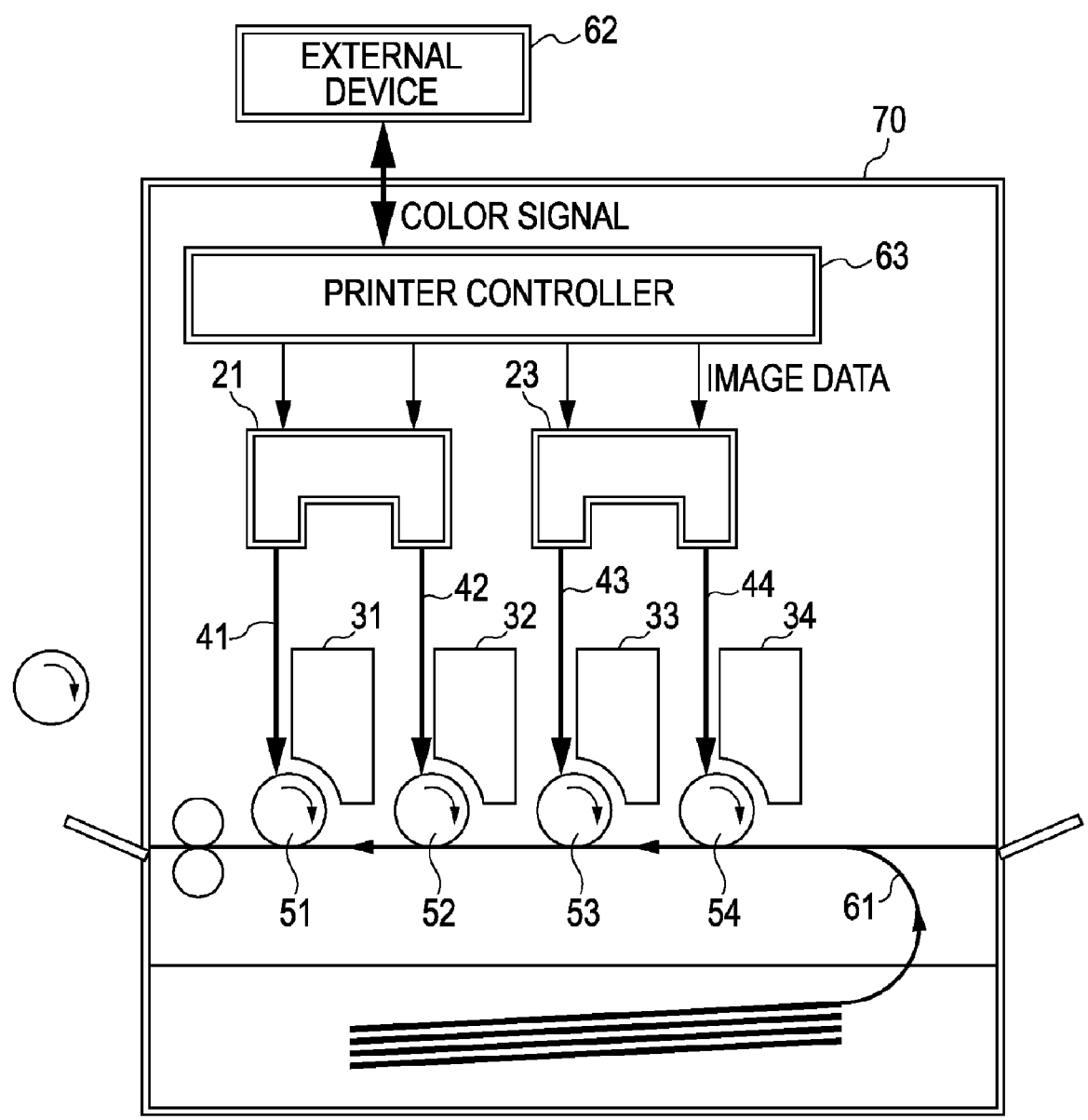
FIG. 13 is a schematic view of an important part of a color image forming apparatus according to an embodiment of the present invention.
Figure 14:
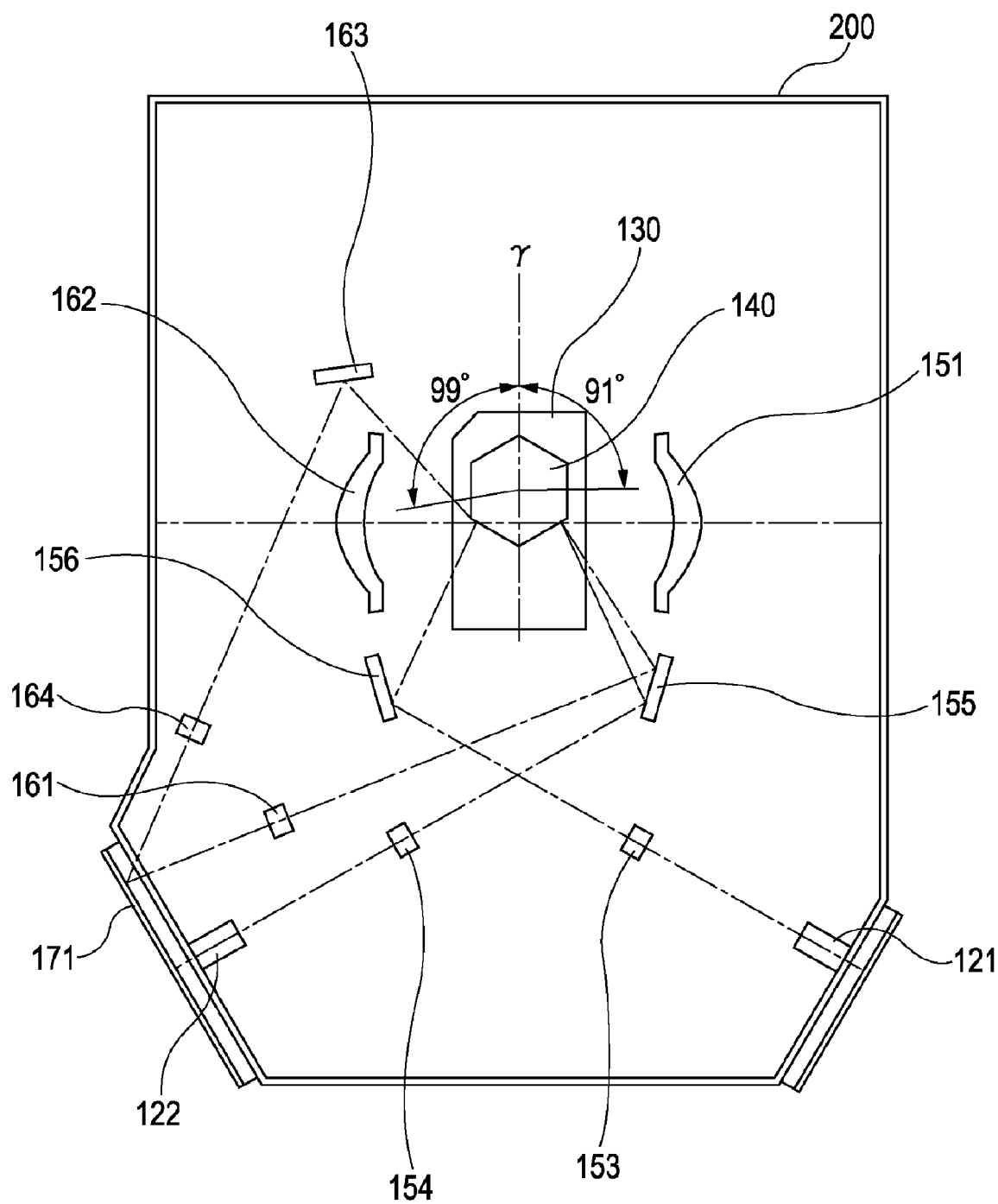
FIG. 14 is a schematic view of an important part of a known optical scanning apparatus.
Figure 15A:
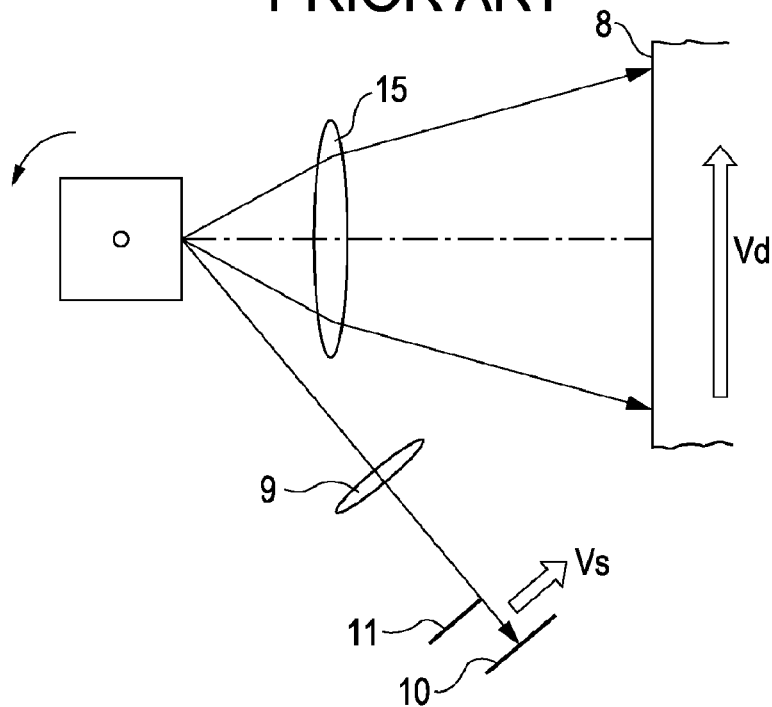
FIGS. 15A and 15B are schematic views of an important part of a known optical scanning apparatus showing a difference in detection timing occurring when the position of a BD slit is shifted in a scanning direction.
Figure 15B:
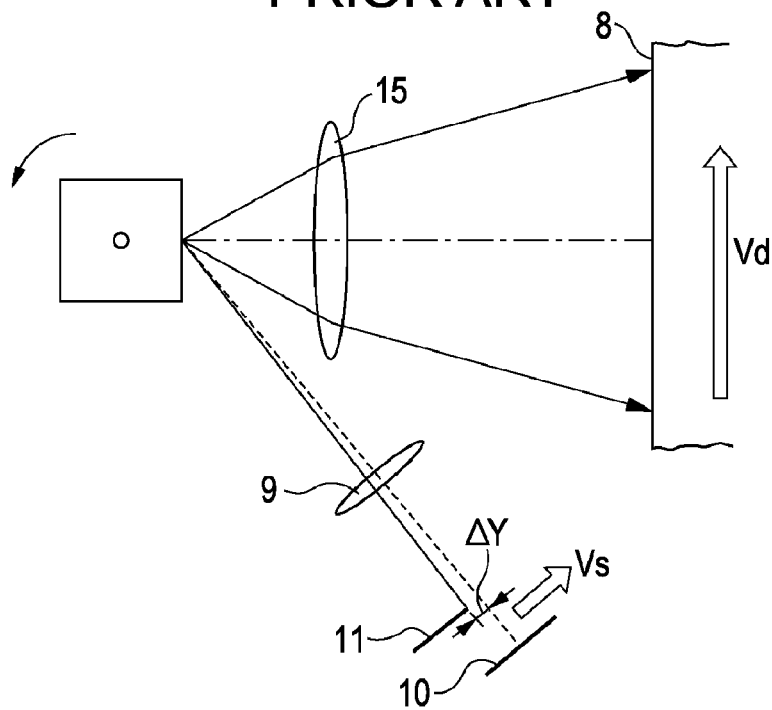
Figure 16A:
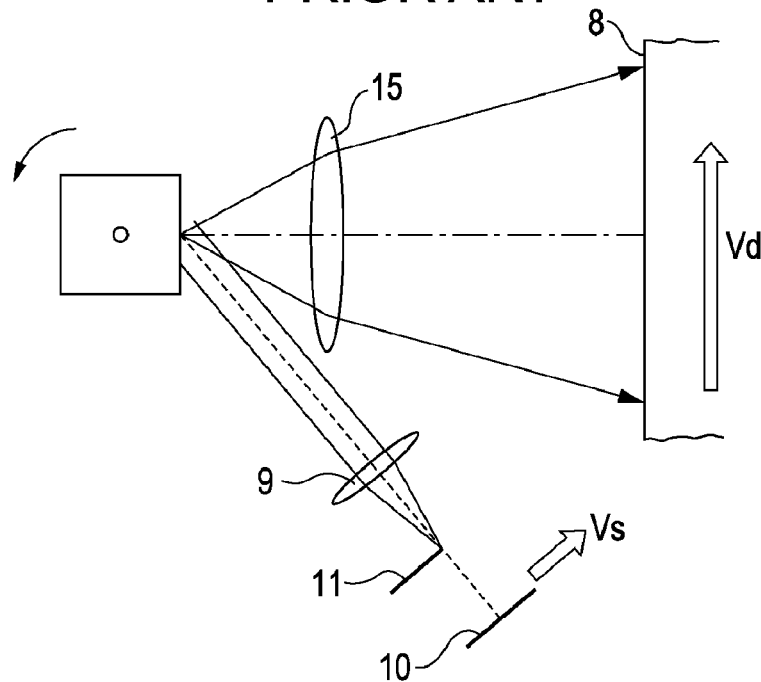
FIGS. 16A and 16B are schematic views of an important part of a known optical scanning apparatus showing a difference in detection timing occurring when the position of the BD slit is shifted in a direction in which the light beam travels and when a multibeam light source is used.
Figure 16B:
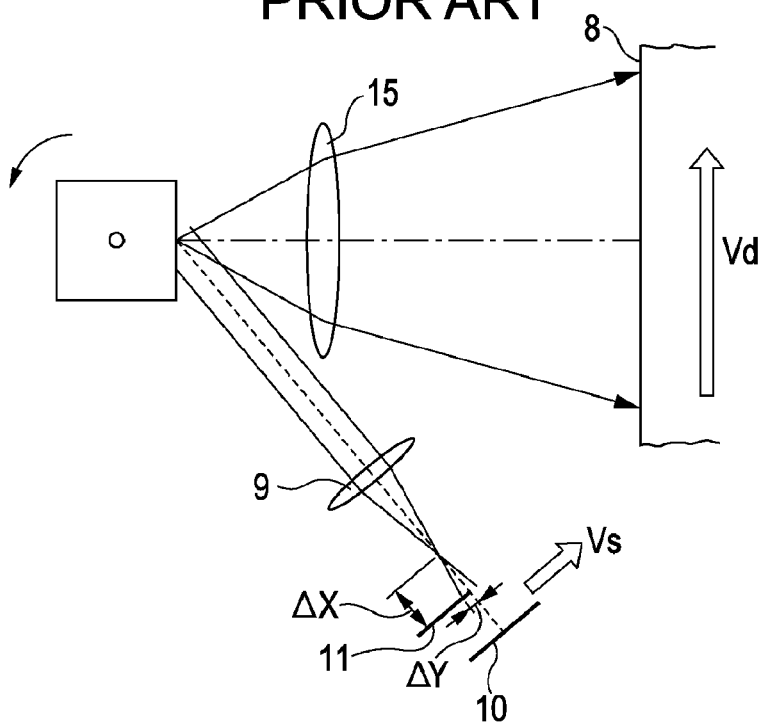

FIG. 13 is a schematic view of an important part of a color image forming apparatus to which the optical scanning apparatus according to the first to seventh embodiments of the present invention may be applied. The color image forming apparatus according to the present embodiment is a tandem-type color image forming apparatus, in which optical scanning apparatuses are arranged side-by-side. The optical scanning apparatuses concurrently record image information on the surfaces of the photosensitive drums, which serve as the image bearing members. FIG. 13 shows a color image forming apparatus 70, optical scanning apparatuses 21 and 23 having the structure according to any one of the first to seventh embodiments, photosensitive drums 51, 52, 53, and 54 serving as the image bearing members, developing units 31, 32, 33, and 34, and a conveying belt 61. The color image forming apparatus 70 has a fixing unit (not shown) for fixing a toner image developed by the developing units and transferred to a recording material.

In FIG. 13, an external device 62, such as a personal computer, inputs red (R), green (G), and blue (B) color signals to the color image forming apparatus 70. These color signals are converted into image data of cyan (C), magenta (M), yellow (Y), and black (B) by a printer controller 63 in the color image forming apparatus 70. The image data of respective colors is input to the optical scanning apparatuses 21 and 23. The optical scanning apparatuses 21 and 23 emit light beams 41, 42, 43, and 44, modulated in accordance with the image data. These light beams 41, 42, 43, and 44 are scanned over the surfaces of photosensitive drums 51, 52, 53, and 54 in the main scanning direction.

The color image forming apparatus according to the present embodiment has the optical scanning apparatuses 21 and 23 arranged side-by-side, corresponding to C, M, Y, and B. The optical scanning apparatuses 21 and 23 concurrently record image signals (image information) on the surfaces of the photosensitive drums 51, 52, 53, and 54, to print a color image at a high speed.

As described above, the color image forming apparatus according to the present embodiment makes the optical scanning apparatuses 21 and 23 emit light beams in accordance with the image data to form latent images of each color on the surfaces of the photosensitive drums 51, 52, 53, and 54. The latent images are transferred to a recording material so as to overlap with each other. Thus, a full-color image is formed.

A color image scanning apparatus having a charge-coupled device (CCD) sensor, for example, may be used as the external device 62. In such a case, the color image scanning apparatus and the color image forming apparatus 70 constitute a color digital photocopier.

Although, the optical scanning apparatus according to any one of the first to seventh embodiments of the present invention is used in a color image forming apparatus, the optical scanning apparatus may of course be used in a monochrome image forming apparatus.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-322077 filed Dec. 13, 2007, which is hereby incorporated by reference herein in its entirety.

What is claimed is:

1. An optical scanning apparatus comprising:
a plurality of light source units;
a deflecting unit having a plurality of deflecting surfaces, the deflecting surfaces configured to deflect and scan light beams emitted from the light source units;
a plurality of incident optical systems configured to direct the light beams emitted from the light source units to the different deflecting surfaces of the deflecting unit, the incident optical systems provided so as to correspond to the light source units;
a plurality of imaging optical systems configured to image the light beams on a plurality of surfaces to be scanned, the imaging optical systems arranged in optical paths of the light beams deflected and scanned by the different deflecting surfaces of the deflecting unit; and
at least one synchronous detection optical system configured to determine a writing timing at which the light beam forms image on the surface to be scanned;
wherein, in a main scanning cross-section, the imaging optical systems are arranged to oppose each other with the deflecting unit therebetween; and
wherein the synchronous detection optical system includes a synchronous detection element configured to detect the light beam deflected and scanned by the deflecting surface of the deflecting unit, at least one optical path changing unit arranged in an optical path between the deflecting unit and the synchronous detection element, the optical path changing unit configured to change an optical path of said light beam deflected and scanned by the deflecting surface of the deflecting unit and direct said light beam to the synchronous detection element, and at least one synchronous detection optical element arranged in an optical path between the optical path changing unit and the synchronous detection element, the synchronous detection optical element having a refractive power at least in a main scanning direction,
wherein the synchronous detection element is attached to a substrate of the light source unit arranged to oppose the light source unit that emits the light beam used for synchronous detection, with the deflecting unit therebetween, in the main scanning cross-section, and
wherein the synchronous detection optical element and the synchronous detection element are arranged to oppose each other with respect to a straight line L0 in the main scanning cross-section, the straight line L0 going through a deflection axis of the deflecting unit and being perpendicular to an optical axis La, Lb of at least one of the imaging optical systems.

2. The optical scanning apparatus according to claim 1,
wherein each of the imaging optical systems includes an imaging optical element, and
wherein the light beam directed to the synchronous detection element does not pass through any of the imaging optical elements.

3. The optical scanning apparatus according to claim 2,
wherein more than one imaging optical element is provided,
wherein the optical scanning apparatus satisfies the following condition:

$$0.6 \times Lg \leq fb \leq 1.2 \times Lg,$$

where Lg (mm) is the physical distance between the light source unit that emits the light beam used for synchronous detection and an exterior of the imaging optical element that is optically closest to the deflecting unit, and fb (mm) is the focal length of the synchronous detection optical element in a main scanning direction.

4. The optical scanning apparatus according to claim 1,
wherein each of the imaging optical systems includes an imaging optical element,
wherein the light beam directed to the synchronous detection element passes through at least one of the imaging optical elements, and wherein the optical path changing unit is arranged in an optical path between the imaging optical element and the synchronous detection optical element.

5. The optical scanning apparatus according to claim 4, wherein more than one the imaging optical element is provided, wherein the optical scanning apparatus satisfies the following condition:

$$0.6 \times Lg \leq fg \leq 8.0 \times Lg$$

where Lg (mm) is the physical distance between the light source unit that emits the light beam used for synchronous detection and an exterior of the imaging optical element that is optically closest to the deflecting unit, and fg is the combined focal length in a main scanning direction of the synchronous detection optical element and all the imaging optical elements through which the synchronous detection light beam has passed.

6. A color image forming apparatus comprising:
   an optical scanning apparatus according to claim 1; and
   a plurality of image bearing members on which images of different colors are formed, the image bearing members being arranged at positions corresponding to the surfaces to be scanned of the optical scanning apparatus according to claim 1.

7. The color image forming apparatus according to claim 6, further comprising a printer controller configured to convert color signals input from an external device into image data of different colors, and input the image data to the optical scanning apparatus.

* * * * *